US007844626B2

(12) United States Patent
Patrick et al.

(10) Patent No.: US 7,844,626 B2
(45) Date of Patent: *Nov. 30, 2010

(54) METHOD AND APPARATUS FOR AUTOMATICALLY PERFORMING AN ONLINE CONTENT DISTRIBUTION CAMPAIGN

(75) Inventors: Edward Patrick, Toronto (CA); James Mason, Sherman Oaks, CA (US); Nehemia Zucker, Encino, CA (US)

(73) Assignee: j2 Global Communications, Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/938,619

(22) Filed: Nov. 12, 2007

(65) Prior Publication Data

US 2008/0065472 A1 Mar. 13, 2008

Related U.S. Application Data

(63) Continuation of application No. 10/737,072, filed on Dec. 15, 2003, now Pat. No. 7,296,026.

(51) Int. Cl.
*G06F 7/00* (2006.01)
(52) U.S. Cl. .................................... 707/784; 707/804
(58) Field of Classification Search ................ 707/100, 707/101, 104.1, 784, 804, 758
See application file for complete search history.

(56) References Cited

U.S. PATENT DOCUMENTS

| 5,499,018 | A | 3/1996 | Welmer |
| 5,923,252 | A | 7/1999 | Sizer et al. |
| 6,026,382 | A | 2/2000 | Kalthoff |
| 6,055,510 | A | 4/2000 | Henrick et al. |
| 6,055,570 | A | 4/2000 | Nielsen |
| 6,236,977 | B1 | 5/2001 | Verba et al. |
| 6,282,567 | B1 | 8/2001 | Finch, II et al. |
| 6,334,110 | B1 | 12/2001 | Walter et al. |
| 6,377,936 | B1 | 4/2002 | Henrick et al. |
| 6,424,951 | B1 | 7/2002 | Shurling et al. |
| 6,442,748 | B1 * | 8/2002 | Bowman-Amuah ......... 717/108 |
| 6,477,575 | B1 | 11/2002 | Koeppel et al. |

(Continued)

OTHER PUBLICATIONS

PCT International Search Report (dated Jun. 13, 2006), International Application No. PCT/US04/42293—International Filing Date Dec. 15, 2004, (Jun. 13, 2006),11 pages.

(Continued)

*Primary Examiner*—James Trujillo
*Assistant Examiner*—Linh Black
(74) *Attorney, Agent, or Firm*—Blakely, Sokoloff, Taylor & Zafman LLP

(57) ABSTRACT

A computer implemented method is described. Data is collected about a number of member entities that have online interaction with a group entity. A predefined state is assigned to a selected one of the member entities automatically, in response to applying a predefined rule to analyze some of the collected data. The rule is defined in part by the group entity. The method automatically determines whether or not online content is to be delivered to the selected member entity, based on the assigned state. In another embodiment, online content that is to be delivered to the selected member entity is automatically personalized for the selected member entity, again based on the assigned state. Other embodiments are also described and claimed.

10 Claims, 21 Drawing Sheets

U.S. PATENT DOCUMENTS

| | | | |
|---|---|---|---|
| 6,519,571 B1* | 2/2003 | Guheen et al. | 705/14 |
| 6,574,606 B1 | 6/2003 | Bell et al. | |
| 6,595,859 B2 | 7/2003 | Lynn | |
| 6,721,713 B1 | 4/2004 | Guheen et al. | |
| 6,741,969 B1 | 5/2004 | Chen et al. | |
| 6,788,771 B2 | 9/2004 | Manto | |
| 6,915,265 B1* | 7/2005 | Johnson | 705/2 |
| 6,934,697 B1 | 8/2005 | Warren | |
| 6,944,669 B1 | 9/2005 | Saccocio | |
| 6,957,429 B1 | 10/2005 | Sekijima et al. | |
| 6,963,850 B1 | 11/2005 | Bezos et al. | |
| 7,107,285 B2 | 9/2006 | von Kaenel et al. | |
| 7,401,025 B1* | 7/2008 | Lokitz | 705/1 |
| 2002/0095391 A1 | 7/2002 | Swart et al. | |
| 2002/0133374 A1* | 9/2002 | Agoni et al. | 705/2 |
| 2003/0046396 A1* | 3/2003 | Richter et al. | 709/226 |
| 2003/0191841 A1* | 10/2003 | DeFerranti et al. | 709/226 |
| 2004/0031058 A1 | 2/2004 | Reisman | |
| 2004/0110119 A1 | 6/2004 | Riconda et al. | |
| 2004/0117839 A1 | 6/2004 | Watson et al. | |
| 2005/0131765 A1* | 6/2005 | Rivera et al. | 705/26 |
| 2007/0220106 A1* | 9/2007 | Reisman | 709/217 |

OTHER PUBLICATIONS m4INTERNET, (BW)(CA-M4INTERNET) M4Internet adds CRM functionality to the M4 suite of email marketing tools, with "'M4 Life Cycle Management', an automated life cycle management email utility", San Francisco (Business Wire) Dec. 16, 2002—M4Internet: A, (Dec. 16, 2002),1 page.

m4INTERNET, "M4Internet Debuts Advanced Email Marketing Analysis Tool for Measuring and Predicting Email Marketing Success and Conversion", San Francisco (Business Wire) Jan. 23, 2002—M4Internet: Advanced Email Marketing & Survey Solutions, (Jan. 23, 2002),2 pages.

* cited by examiner

Data Collection Methods (DCM) 304

| Email Campaign Tracking: | Online Survey Tracking: | Web Campaign Tracking: | Member Database & Arbitrary Data. |
|---|---|---|---|
| Opens. Clicks. Conversion. Historical. | Answers. Historical. | Impressions. Clicks. Conversion. Historical. | |

Business Rules Engine (BRE) 308

1. Takes input from the Data Collection Methods.
2. Applies Rules-Sets created and managed in the Life Cycle Mangager to determine the "State" for each individual person.
3. Makes the "State" information available to the Content Presentation Methods.

Content Presentation Methods 312

| Email Personalized by: | Online Surveys | Web Content Personalized By: | Arbitrary Export |
|---|---|---|---|
| Substitution. Environment Variables. Conditional Content. Database Values. State. | | Substitution. Environment Variables. Conditional Content. Database Values. State. | |

```
Safari  File  Edit  View  History  Bookmarks  Window  Help    ⬥ ⬜ (Charged) 18:19

▲ ▼  ◀ ▣ ⟲  +  http://info.efax.com/cgi-bin/broadcast/frameset.cgi                Q ▼ Google File | Permissions | Rule Set | Rule | Report | Desktop
Description  Properties  Selection  Minimum age  Activate
```

Change the properties of the Current LCM Rule

▯  000ed
"From" State:       [ 1 ]    This rule is applied only to those records already in the "From" State.    blo.rtf "To" State:         [ 3 ]    This rule, when applied, transitions matching records into the "To" State.

Execution Order:    [10]     When the LCM Rule Set runs on a list each rule defined for the list is     ▯  000hel
                             applied in turn, to all matching records. The execution order determines     miz.rtf
                             the order in which rules are applied; those with lower numbers run first.

[submit]

Current Status
    User: Login: edp
          Email: epd@m4internet.com
    Open LCM Rule: (#18)
          Description: (distribute) to (signature) transition
          owner: edp
          QA State: Untested
          Created: Tue Dec 2 17:54:36 2003
          Modified: Tue Dec 2 17:54:38 2003

Set the Minimum Age for the Current LCM Rule

Minimum Age: [2]

This rule will apply only to those records that have been in the "From" state for the specified number of days.

[submit]

Current Status
User: Login: edp
Email: epd@m4internet.com
Open LCM Rule: (#18)
Description: (distribute) to (signature) transition
owner: edp
QA State: Untested
Created: Tue Dec 2 17:54:36 2003
Modified: Tue Dec 2 17:54:38 2003

METHOD AND APPARATUS FOR AUTOMATICALLY PERFORMING AN ONLINE CONTENT DISTRIBUTION CAMPAIGN

RELATED MATTERS

This application is a continuation of U.S. application Ser. No. 10/737,072, filed Dec. 15, 2003 now U.S. Pat. No. 7,296,026, entitled "Method and Apparatus for Automatically Performing an Online Content Distribution Campaign".

BACKGROUND

An embodiment of the invention is directed to automated processes for distributing online content that may be used for influencing the behavior of recipients. Other embodiments are also described and claimed.

Online content provision including online advertising and marketing has grown steadily since the inception of the Internet and the growth of publicly available online services. Users can access a wide variety of information that meets their interests, by for example accessing Web sites that are generated by content providers. A computer equipped with a client program called a "browser" makes it a relatively simple task to traverse the vast network of information available on the Internet and in particular through the protocol known as the "World Wide Web". In addition to Web sites however, other types of online content delivery techniques have flourished, including electronic mail (email) and online chat (e.g., Instant Messaging). Software protocols have been developed that allow relatively rich content to be included in addition to plain text, such as graphics, audio and video.

An individual user's interactions with a particular merchant's Web server may be tracked. For example, visits, sales, buying trends, product/service preferences, as well as identifying information such as the user's home or office location geographically speaking may be discovered. Based on this information, a service provider may then present or offer its customers certain products and services that are believed to most likely to be purchased on an individual basis. To gain new or retain existing customers, a provider may need to ensure that it presents products and services that the consumer is interested in and is likely to sign up for or purchase. Accordingly, the importance of targeted advertising and content provision is becoming an important role in the way providers conduct business over the Internet.

Recently, more sophisticated techniques for online marketing have been developed to help better promote the products and services of merchants who have online presence. For example, email marketing has proven to be an efficient and effective way to engage a merchant's existing customers, as well as attract potential consumers. Email messages (as part of what is referred to as an email "campaign") may be sent automatically to a list of addressees including existing customers, where these email messages may originate from an Internet domain of the merchant and contain some form of targeted advertising. There are also products that are available to help increase a merchant's list of opt-in recipients, improve the percentage of the outgoing email messages that are actually opened by the recipient, customize the format, content, and subject line of the email so the recipient will be more eager to do business with the merchant, and measure the results of this email campaign to determine whether the money has been well spent. Such marketing tools become even more important when considering that consumers generally eye online marketing that is in the form of unsolicited email or spam suspiciously.

Conventional implementations of target content provisions for Web sites are also associated with the disadvantage of time consumption. The conventional techniques for adjusting Web site and email campaign renderings is a time consuming process which incorporates continuous human intervention and an extreme amount of information. To evaluate the success of content presented on Web sites, the providers of the site generally collect user response data similar to that described above. That is, user information such as cookies, and general content information is monitored and collected. A database is created of this collected information, which includes massive amounts of data. The information is later analyzed either by an analytical engine, or through user intervention, and resultant data is created expressing the likelihood of successful content for various profiles of target users. Decisions are made on the type of content that should be provided, and the content is manually adjusted by a human. This includes changing a Web site's presentation, or the content provided by the site, for example, or offering a discount on a type of product or service for sale. This process, however, may require highly skilled programmers operating a database with a complicated database query language, and can take days, weeks or sometimes months to update an email or Web site campaign, depending upon the resources available to a provider.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIG. 3 shows example software functional blocks of an embodiment of the invention being an online marketing tool/system.

FIG. 6A-6C depict various screen shots from a Web-based interface to the online marketing system (Campaign Manager).

FIG. 7A-7F depict screen shots from another Web-based interface to the system (LCM Interface).

DETAILED DESCRIPTION

According to an embodiment of the invention, an online marketing system is described which allows a merchant having online presence to set up a sequence of targeted online content deliveries, based on collected data about the behavior or characteristics of its customers. For example, a series of follow-up emails may be set up based on preset customer life cycle benchmarks, such as a customer moving from one level of online service to another. Once the rules have been set, the system may automatically apply the rules to every customer in a database list, to determine whether the email should be sent or not. In the particular case of a telecommunications and messaging service provider, for example, the system may help better identify the opportunities for paid services from a free subscriber base, by automatically processing a long list of free subscribers to determine which ones are ripe for an upgrade offer. As another example, a series of emails may be sent to a given customer, based on that customer's current life cycle stage or "state" in combination with their responses to a large email campaign, Web site registrations, confirmation emails, or other preset special triggers. More generally, the system and methodology described here may be used not only by merchants (e.g. banks, online service providers, manufacturers of goods, etc.), but also non-commercial institutions such as educational or governmental entities in an attempt to determine how best to encourage certain behavior on the part of their members.

According to an embodiment of the invention, a computer implemented method and system involves collecting data about a number of member entities that have online interaction with a group entity. A state is automatically assigned to each member in response to applying a rule-set to analyze the collected data. The rule-set may be defined in part by the group entity. This system then automatically determines whether or not online content is to be delivered to the member, based on the assigned state. In another embodiment, online content that is to be delivered to the selected member is automatically personalized or changed for the member, again based on the current assigned state of the member. The following describes some aspects of the system in the context of a commercial application where the group entity is a merchant having online presence and the member entities are the merchant's existing customers (e.g., subscribers). The description, however, is not limited to such a commercial application.

Figure 1:
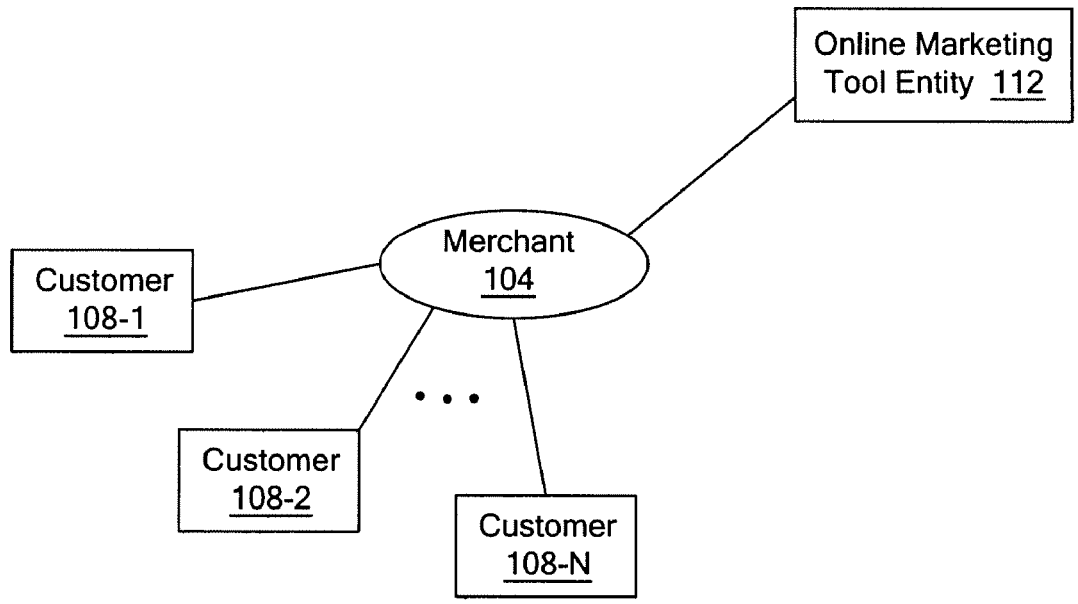
FIG. 1 is a block diagram that shows the different entities and their relationships in a commercially oriented embodiment of the invention.

Beginning with FIG. 1, FIG. 1 is a block diagram that shows the different entities and their relationships in a commercially oriented embodiment of the invention. A merchant 104 has an existing relationship with several customers 108-1, 108-2, . . . 108-N (108). This relationship may be a form of online subscription to, for example, unified voice and facsimile messaging services such as those provided by j2 Global Communications, Inc. of Hollywood, Calif. This relationship may be a paying one, where the customer 108 has agreed to make payments to the merchant 104 either on a one time or periodic (e.g., month-to-month) basis, for products and/or services provided by the merchant 104. Such a merchant 104 may know one or more data network addresses that have been assigned to the customer 108 (e.g., an email address; an online chat identifier; etc.). In addition, the merchant 104 may also have a telephony address for each customer, such as an inbound fax/voice mail telephone number for each customer 108.

The merchant 104 may also have a separate relationship with an online marketing tools entity (OMTE) 112. An example of such an entity is M4Internet of San Mateo, Calif. M4Internet provides advanced email communication and other online marketing solutions to corporations that use online marketing to promote their products and services. The OMTE 112 may enter into a separate contractual relationship with the merchant 104, to provide its online marketing tools and services to help maintain or enhance the merchant's customer base. As an alternative, the OMTE 112 may be a wholly owned subsidiary of the merchant 104, or simply a subset of the merchant 104 that is part of the marketing department. Although not shown, there may be third party online content merchants involved with either the merchant 104 or the OMTE 112, to assist in, for example, hosting server applications to enhance the merchant's online content or its delivery.

Figure 2:
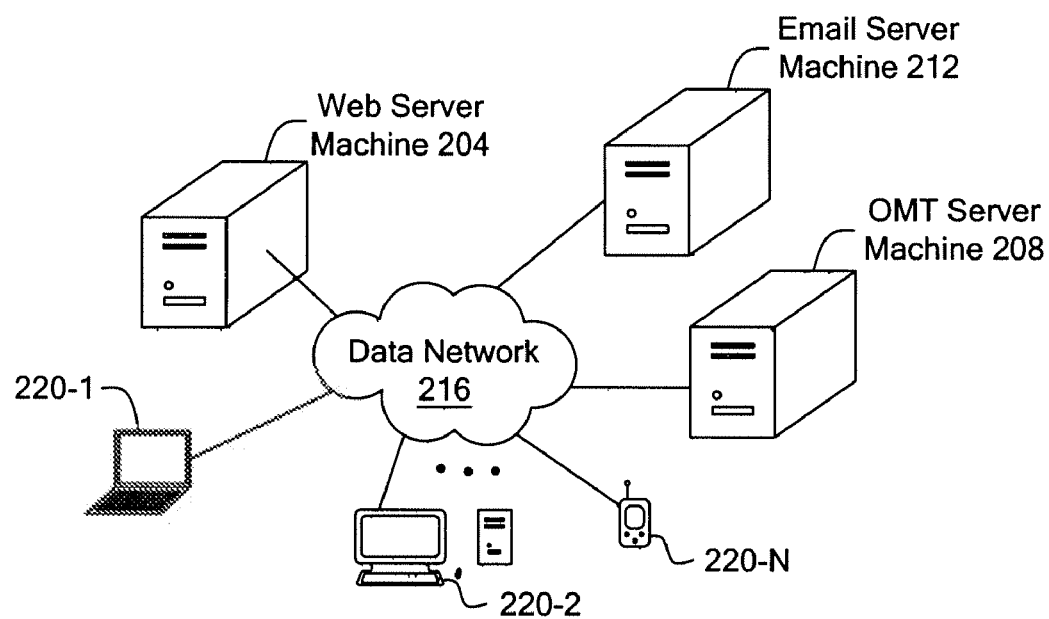
FIG. 2 depicts a data networking environment in which the different entities may communicate with each other.

Turning now to FIG. 2, FIG. 2 depicts a data networking environment in which the different entities may communicate with each other and over which the online marketing system operates. The online marketing system described here may be implemented using a group of server machines 204-212 that are communicatively coupled to each other via a data network 216. In the particular example shown, the data network 216 is the public Internet. There is a merchant Web server machine 204 that serves up Web pages, an OMTE server machine 208 that acts as an interface to the online marketing system's software components, and an email server machine 212 that provides assistance in delivering online content on behalf of the system. In addition, additional hardware such as database server machines may be needed to store a large amount of collected customer data. It should be noted, however, that the software components to be described below may be designed to run in a network hardware topology that is different from that shown in FIG. 2.

Each customer 108 may have a client process that is running in a client machine 220 that is an end user node of the network 216. A client server protocol may be used to communicatively connect a client process (such as a browser or an email client program) with a server process, to send requests and receive online content from the servers. Such online content may be embodied in an online chat message, an email message, or a Web page. Such online content will be experienced by the customer 108 through its respective client process, in the form of, for example, text, graphics, audio, and video. The software architecture of the online marketing system described below may be implemented, on the server side, in one or more of the server machines 204-212. The client process aspects of the system, such as mechanisms in the Web browser software used by the customer 108, may normally be running in a client machine 220. Note that the customer client machine 220 may be any type of a computing or communications device that is capable of connecting to the data network 216 as an end user node, for example.

Some of the software function blocks of an embodiment of the online marketing tool/system is shown in FIG. 3. The system may be designed with three main components, namely Data Collection Methods 304, a Business Rules Engine 308, and Content Presentation Methods 312. Although these are refereed to as "methods", they are for the most part software processes that may, of course, be viewed as software stored in some machine-readable medium such as a solid state memory or a non-volatile mass storage device (e.g., magnetic disk drive). In addition, the software may be stored and executed in distributed fashion, over multiple, networked machines.

The Data Collection Methods 304 serve to collect data about multiple customers of a merchant that has online presence. The methods may be viewed as conduits for customer or user-specific information to enter the system. These methods may gather information through several means. For example, there is email campaign tracking, which refers to determining information about email opens, clicks, conversion, and forwarding. Historical information is also recorded, on a per customer/user basis and a per email campaign basis.

The Data Collection Methods 304 may also include online survey tracking which keeps a record of all responses to survey questions, user agents, operating system and other information that may be recordable by a Web server, again uniquely on a per individual, per survey basis, and on the basis of the email campaign that references the survey.

Yet another feature of the Data Collection Methods 304 may be the ability to track a Web content campaign. This would include recording any impressions, clicks and conversions that a particular user provides while visiting the merchant's Web site. Again, the data is recorded uniquely on a per individual and per Web content campaign basis.

The collected data may be of two types, native (innate) and arbitrary. Native or innate refers to something of which the system has an understanding, or was designed to generate. Native data may be information gathered from a customer's reactions or responses to marketing communications (e.g., an online marketing campaign of the merchant), and customer service messages (e.g., a particular customer makes a disproportionately large number of service requests on a certain topic). In contrast, arbitrary data is data whose meaning the system is not sure of. Arbitrary data may include information that has been imported into the system. For example, data collected from other sources and transmitted to the system, such as billing data that is processed by the merchant or some third party that the merchant engages. The arbitrary data may come from any external source through either a manual or automated process.

Figure 4:
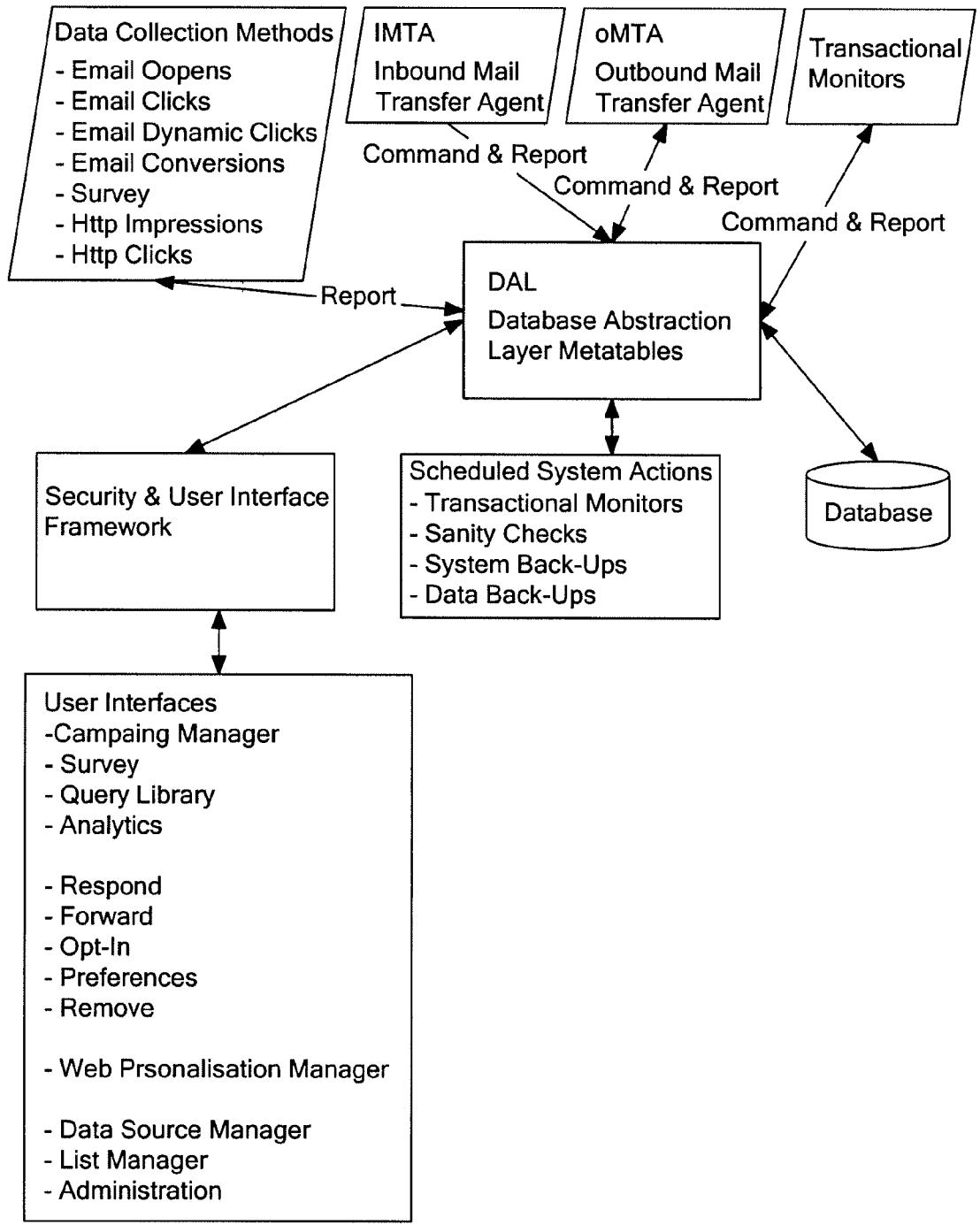
FIG. 4 identifies various software I/O processes that use the same database abstraction layer of the online marketing system.

The native data (also referred to as customer data) may be stored in a database. Both the customer database and arbitrary data may be managed through a software component referred to as a List Manager which also defines a means for creating and maintaining the structure and meaning of any data set. As shown in FIG. 4 (to be further described below), the List Manager may automatically create "meta-data" to describe the native and arbitrary data in what is referred to as a database abstraction layer (DAL). The DAL represents the structure and meaning of data. Any system that accesses the data preferably uses the DAL, to be able to present the meaning of the data in human understandable form to an operator of the system. This allows a user-friendly, graphical interface to be provided so that the operator need not be versed in a database programming or query language.

The List Manager may be extended through a plug-in architecture that can perform any type of pre-processing to any data set, prior to importing the data into the system. Such a plug-in architecture may apply interpretation rules to obtain valuable augmentation of the data. For example, if a certain email address (be it that of a customer, or that of a recipient used by a customer for sending messages, for example) ends in "ac.uk", then this may cause the system to mark the person (associated with that email address) as being a student or teacher and assign the United Kingdom as its country code.

The Data Collection Methods may, for example, be designed to translate a detected Internet Protocol (IP) address of a customer's client machine into a top level domain name from which the system may assume that the customer is an employee of the company who owns the domain name. The Data Collection Methods may also be designed to detect whether a particular customer is mobile, or works from a home office. Additional data about the customer that may be useful to collect for marketing purposes include the network connection speed that may be sustained at the client machine, the type of browser being used, the type of operating system, as well as the human language that is being used in the client machine. Such arbitrary data may then be augmented manually by an operator of the Data Collection Methods, so that inferences about the customer's behavior, habits or preferences may be made.

Still referring to FIG. 3, the Data Collection Methods 304 are to be used by the Business Rules Engine (BRE) 308. The BRE 308 applies rules that have been created and managed in a software component referred to as a Life Cycle Manager (LCM), to determine the current "LCM state" to be assigned to a particular customer. The application of such rules uses information obtained from the Data Collection Methods 304. For example, if two new customers were to register for a particular service, and one of them uses the service while the other does not, then a relevant business rule might be the following: If a new customer has not used the new service within two weeks of sign up, then that customer is considered dormant. The state to be assigned to such a customer would then be the "dormant" state. Alternatively, there may be three different states that are created to implement that example. State one would be those customers who are less than two weeks old; state two are customers who are at least two weeks old and have used the particular service; and state three are customers who are at least two weeks old but have not used the service. All of such information may be stored in the database, in different fields. The business rules would be periodically applied by the system, to transition a particular customer from one these states to the other as time passes and as information about their usage of the service is recorded by the Data Collection Methods 304.

Another way to describe how the LCM state information is processed is to consider that a state variable is associated with each customer. This variable may be given an initial value, such as "New" for a relatively new customer. The variable may then be updated when certain rules are applied that will change it from "New" to for example "Ready for a Digital Signature Offer", indicating that the customer may now be likely to subscribe to certain additional services of the merchant.

According to an embodiment of the invention, the system may be designed to perform complex analysis and computations in order to determine the next state of a customer. In other words, arriving at the current state of a selected customer may be such a complex task that it cannot be performed on a real time basis for each of a large number of customers that will be the recipients of an email campaign. For example, there may be hundreds or thousands of customers from which to select those that will be the recipients of an email campaign. Updating the state assigned to each of these customers may involve the application of tens or even hundreds of rules to arrive at the current state of a customer. Therefore, as data is collected, the system continues to update the states of the customers by applying its many rules.

A fast lookup table may be kept by the system, where the current state of each customer is recorded and can be retrieved in real time. In other words, when the time comes for the system to generate and send out a marketing message intended for a particular customer, the state of that customer is in effect looked up in the table so that the message may be quickly customized for that customer, and then delivered to the customer immediately. Meanwhile, the Business Rules Engine 308 may continue to update the states of the customers in the lookup table based on information that is being gathered continuously. This lookup table may be accessed by The Content Presentation Methods 312 to determine whether or not new online content is to be delivered to a selected customer, as well as how certain online content should be personalized for a given customer, both based on the current state of the customer.

Still referring to FIG. 3, the Content Presentation Methods 312 are designed to influence customer behavior, using information and analysis that has been generated by the Business Rules Engine 308. For example, an email campaign may target all customers that are in the same "state". An email campaign may also be personalized on the basis of any data point in the system, including the computed "state". As will be described below in the section entitled "Email Authoring and Tagging", email may be personalized by some type of substitution process, environment variables, conditional content, values in the database of the system, as well as of course as mentioned above a state of the selected customer. Other online content that may be personalized includes surveys and Web site content. An example of this will be described below, where a fragment of a Web page is customized, to deliver different content on the basis of the individual customer's state. Finally, arbitrary output may be generated for integration with other systems, again based on any aspect that has been recorded in the system.

Turning now to FIG. 4, this figure identifies various software I/O processes that make up the system and that use the same data base abstraction layer (DAL).

Data Collection Methods use the rules in the DAL to determine where to store the data they collect. A Web based systems for example allows the operator to use the data stored by the Data Collection methods taking advantage of the DAL to specify the user interfaces and to determine how to perform database queries. When arbitrary data is being imported into the system through either manual or automated processes the determination of where and how to record the arbitrary data may be governed by rules in the DAL.

The iMTA (inbound Mail Transfer Agent) is software component that uses the DAL to determine how to read the rules it uses to respond to incoming email, e.g. bounced mail, mail from customers, etc., and how to record the information it receives.

The oMTA (outbound Mail Transfer Agent) uses the DAL in the same way as the iMTA, but processes email that is sent out by the merchant, e.g. email campaign directed to the customers.

The rules that control the structure, meaning the processing rules for data are specified in the List Manager.

Another feature of the online marketing system described above is that the content presentation may be automatic in the sense that a human operator is not needed to launch a particular online content distribution campaign. Of course, a manual, sign off feature may be added so that no campaign is actually launched until approved by a human operator. However, essentially all aspects of the campaign up until that point, including who the recipients are and how to personalize the content to be delivered, may be automatically determined by the Content Presentation Methods 312. Note that the delivery of the content may be either "pushed" by the merchant under control of the OMTE (see FIG. 1), where the timing of the launch is decided upon by the merchant and/or OMTE, or the delivery may be triggered by a demand that originates from the customer (such as a request from the customer for additional information or help about a particular product or service). In both cases, the content may be personalized for the customer, based on that customer's current LCM state value as maintained by the system.

A particular message that will be delivered to the selected customer may be a one time message or it may be a "periodical" that will be repeated every predetermined period of time, such as every week or every month.

The following example (in the context of a telecommunications and/or unified messaging service provider) will serve to illustrate operation of the system as described above. The numbers used are, of course, only examples and are not intended to limit the scope of the invention being claimed. Note a general goal of the system is to influence the behavior of a particular member (e.g., customer) by monitoring the behavior of the selected member, as well as others that may be relevant (as determined by a human operator, for instance). This is done by personalizing or targeting certain online content to the customer, based on the current state value assigned to the customer. This also encompasses an inquiry into what path was taken to arrive at the current LCM state. In other words, the online content may be personalized differently, depending upon which path of states was taken to arrive at the current state.

In the first example, assume that the merchant has a customer who has just signed up for a free, online service offered by the merchant. In particular, assume the service is a unified messaging service such as the inbound (or "Receive") facsimile service offered by j2 Global Communications, Inc., where a unique, inbound voice/fax telephone number is assigned to the customer. Voice and fax messages received via this number are forwarded by the merchant's network of servers to an email address of the customer. Also, the initial sign up is for a free service, with up to twenty facsimile pages allowed per month.

Next, assume that the marketing department of the merchant has determined how to go about customizing the content of an email, a Web frame, or an inbound facsimile that will be directed to certain free customers, in order to induce them to upgrade to a paid service that allows more than twenty facsimile pages per month (at a per page charge, or a flat charge). In addition to the particular content, the marketing department has also determined the processes used to distinguish this particular type of customer (e.g., those that have less than twenty pages per month versus those that have more than twenty pages per month of facsimile usage). FIGS. 5A-5D show an example flow diagram for a free high volume (FHV) LCM cycle that originates with the marketing department and will be implemented in the online marketing system (and in particular using the Data Collection Methods, Business Rules Engine, and Content Presentation Methods of FIG. 3). The FHV cycle depicted in FIGS. 5A-5D would be one that the system would periodically execute so as to better manage the accounts of customers that subscribe to the free service but have relatively high volume of usage.

Figure 5A:
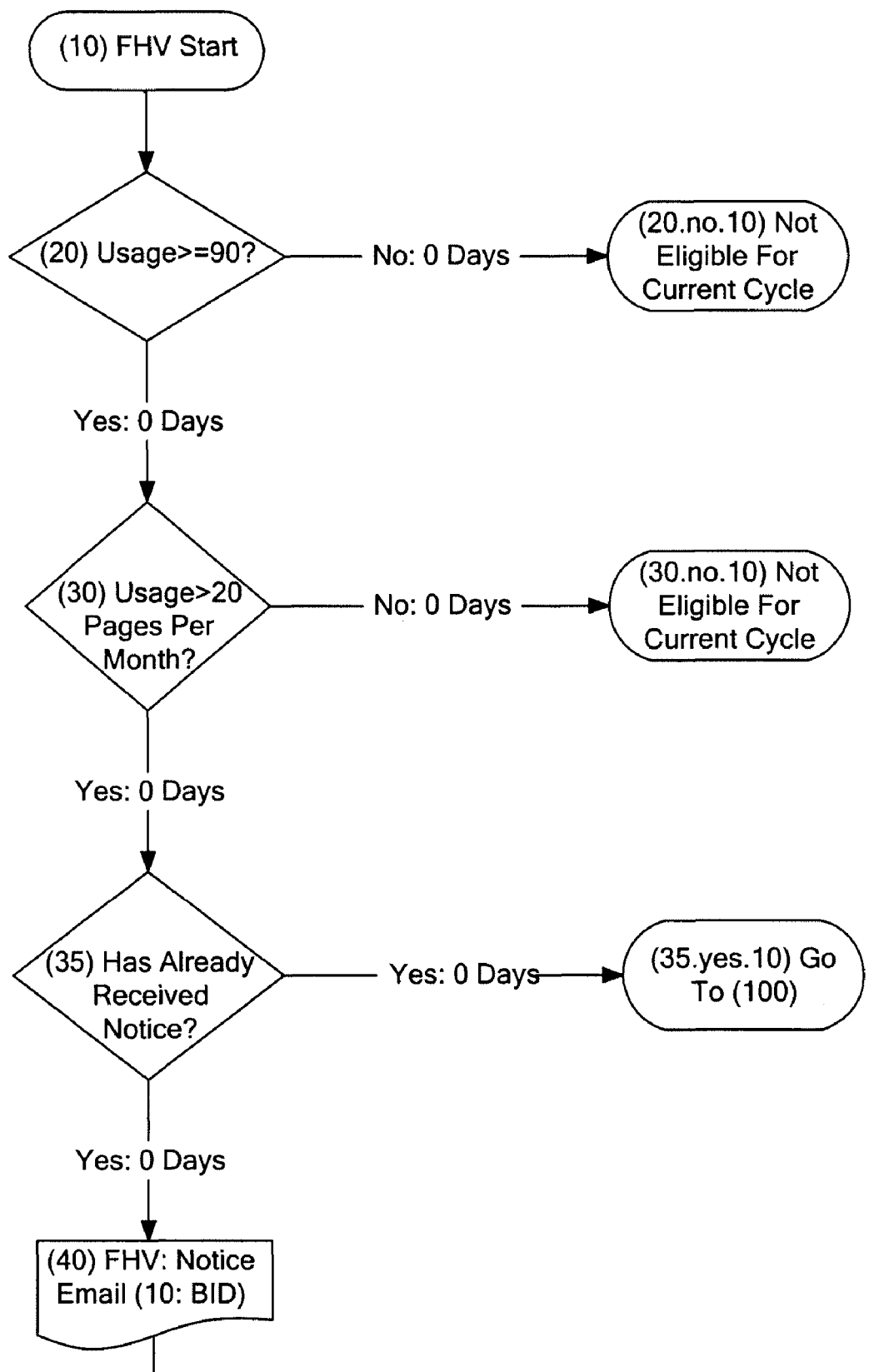
FIG. 5A-5D is a flow diagram of a free high volume (FHV) cycle of the online marketing system suitable for customer life cycle management (LCM) of a telecommunications or messaging service provider.
Figure 5B:
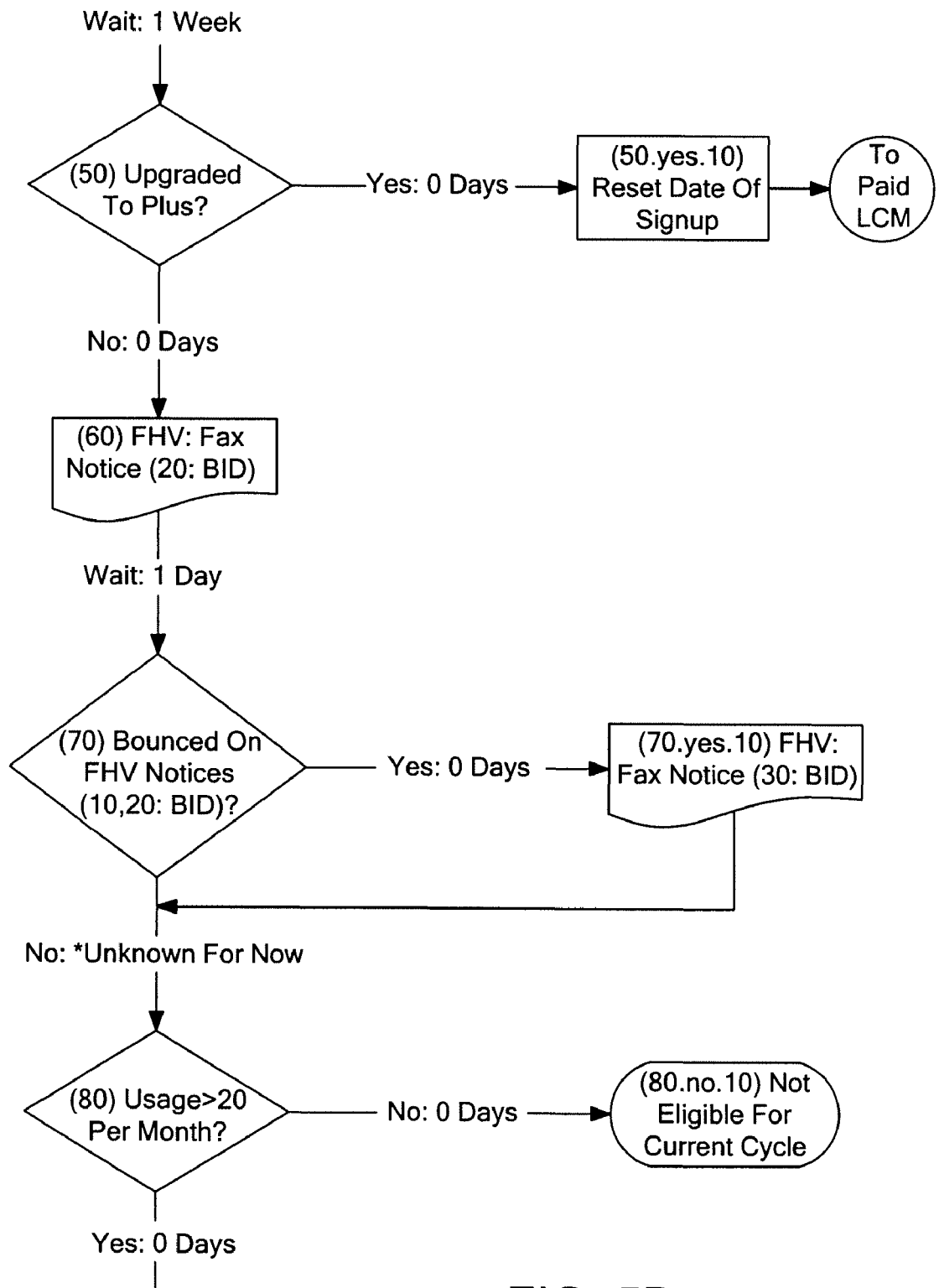
Figure 5C:
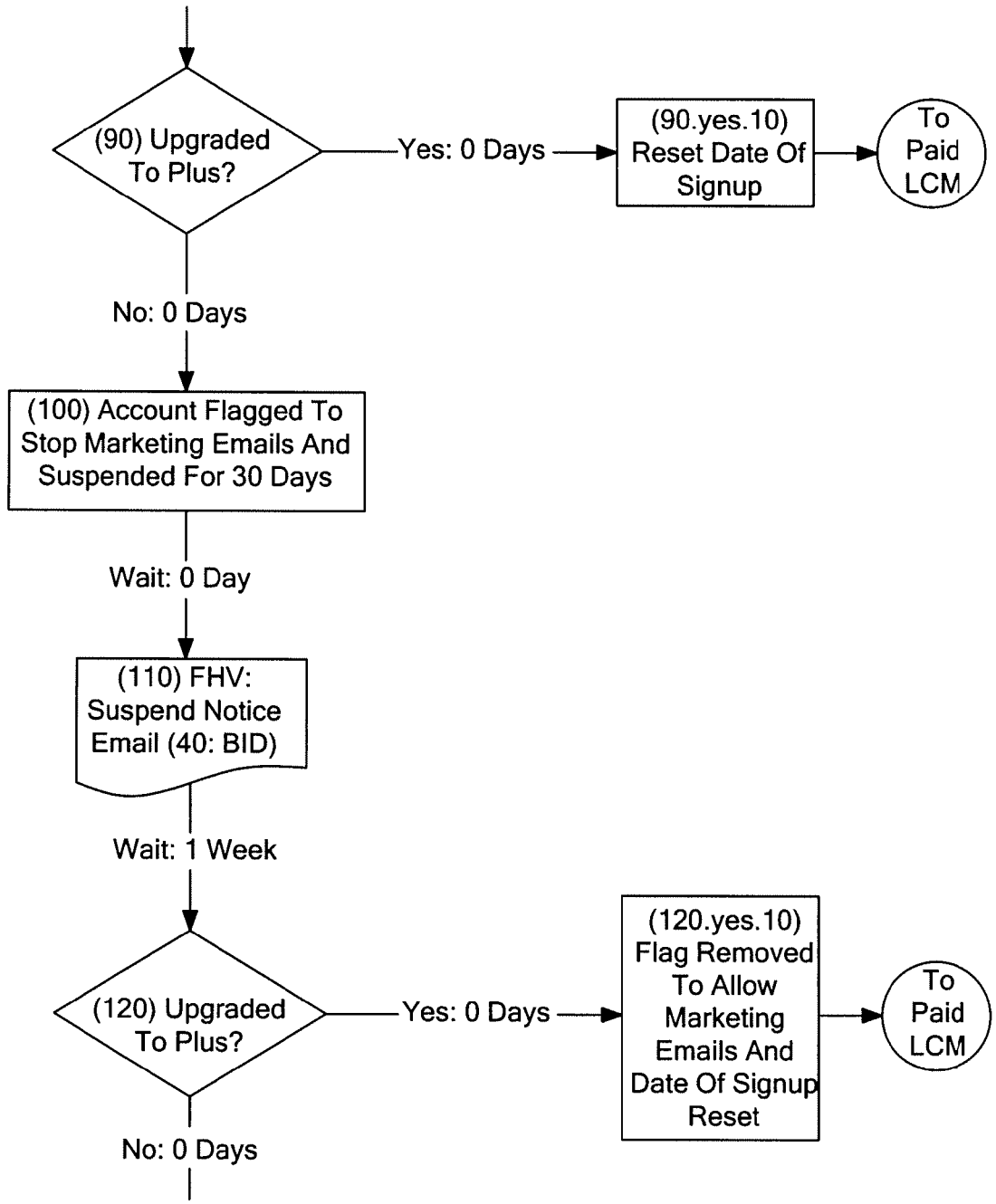
Figure 5D:
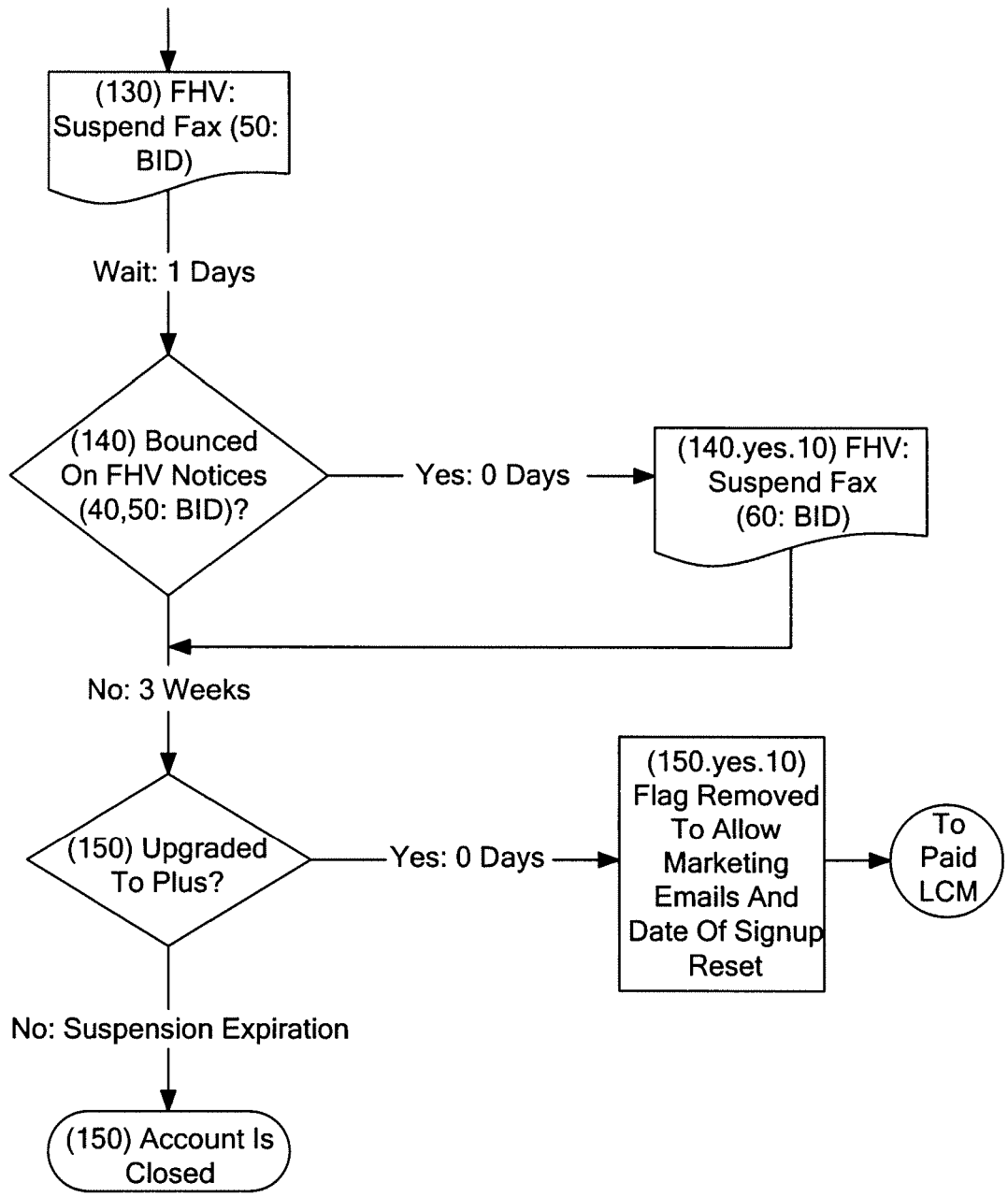

Referring now to FIG. 5A, the FHV cycle may be applied to every free customer in the merchant's database. Note that marketing has determined in this case that the targeted content should not be sent to relatively new customers as their pattern of usage may not have stabilized (decision block 20 where it is decided that the rest of the cycle is not applied to customers that are less than ninety days old). For those who are at least ninety days old, the process continues with decision block 30 which asks whether there has been a high volume of usage per month. Again, the cycle need not be continued for those customers who are not considered to be high volume users. Otherwise, the process continues with decision block 35 where the system inquires as to whether this customer has already received a notice regarding excessive usage. If not, then an email notice is sent out in block 40.

A week later, the system resumes the FHV cycle with decision block 50, inquiring as to whether this particular customer has upgraded to the paid service. If so, then the sign up date for this customer is reset in block 50 and the customer is removed from this cycle and added to the list of another cycle, here referred to as the "Paid LCM List" which may include only paying customers.

On the other hand, if the customer has not upgraded yet, then another attempt is made to contact the customer this time via a facsimile notice (sent to its assigned, inbound telephone number) as indicated in block 60. The cycle then waits one day before checking whether the email and facsimile notices bounced, in decision block 70. If they did, then a different attempt to alert the customer is made. Otherwise, the cycle waits for a predetermined period of time before checking, in decision block 80, whether the usage still continues to be excessive. If the usage continues to be excessive, and the customer still has not upgraded to the paid service, then the account is flagged to stop sending marketing emails and suspended for in this case at least thirty days.

Upon expiration of the thirty days, the FHV cycle resumes with a suspend notice being emailed to the customer's email address (in decision block 110). A week later, the cycle then checks again in decision block 120 whether the customer has upgraded. If still no upgrade, then a facsimile is sent to the customer's inbound telephone number indicating that the account will be suspended (decision block 130). If the facsimile notice did not bounce (decision block 140) then three weeks later a final check as to whether the customer has upgraded is made (decision block 150). If not, the account is closed (block 160) and the customer is removed from the FHV cycle list.

With the flow diagram of FIGS. 5A-5D having been defined, the marketing department may then request the OMTE (see FIG. 1) to translate the flow diagram into a description language that refers to (i) "states" and (ii) "selections" or "conditions" that, if satisfied, make a transition from one state to another. The state and transition description language code for the FHV cycle described above may begin as follows:

if (user_state==10 && user_age>=90 days)
then user_state: =20
.
.
.
if (user_state==20 && user_usage>20)
then user_state: =30

In the example above, for the FHV cycle, if the current state of the user is "10" and the age of the user is more than ninety days, then the state of the user will be changed to "20". Otherwise, the state of the user remains "10". The description language continues with the additional rule, where if the current user state is "20" and usage is above twenty, then the state of the user is changed to "30". Otherwise, the state of the user remains unchanged.

Once the business rules have been defined as above for the entire flow diagram of a given LCM cycle, an operator of the online marketing system may enter this information into the system and configure the content presentation methods, via a user interface such as one illustrated by the screen shots of FIGS. 6A-6C, 7A-7F, and 8A-8C.

Figure 6A:
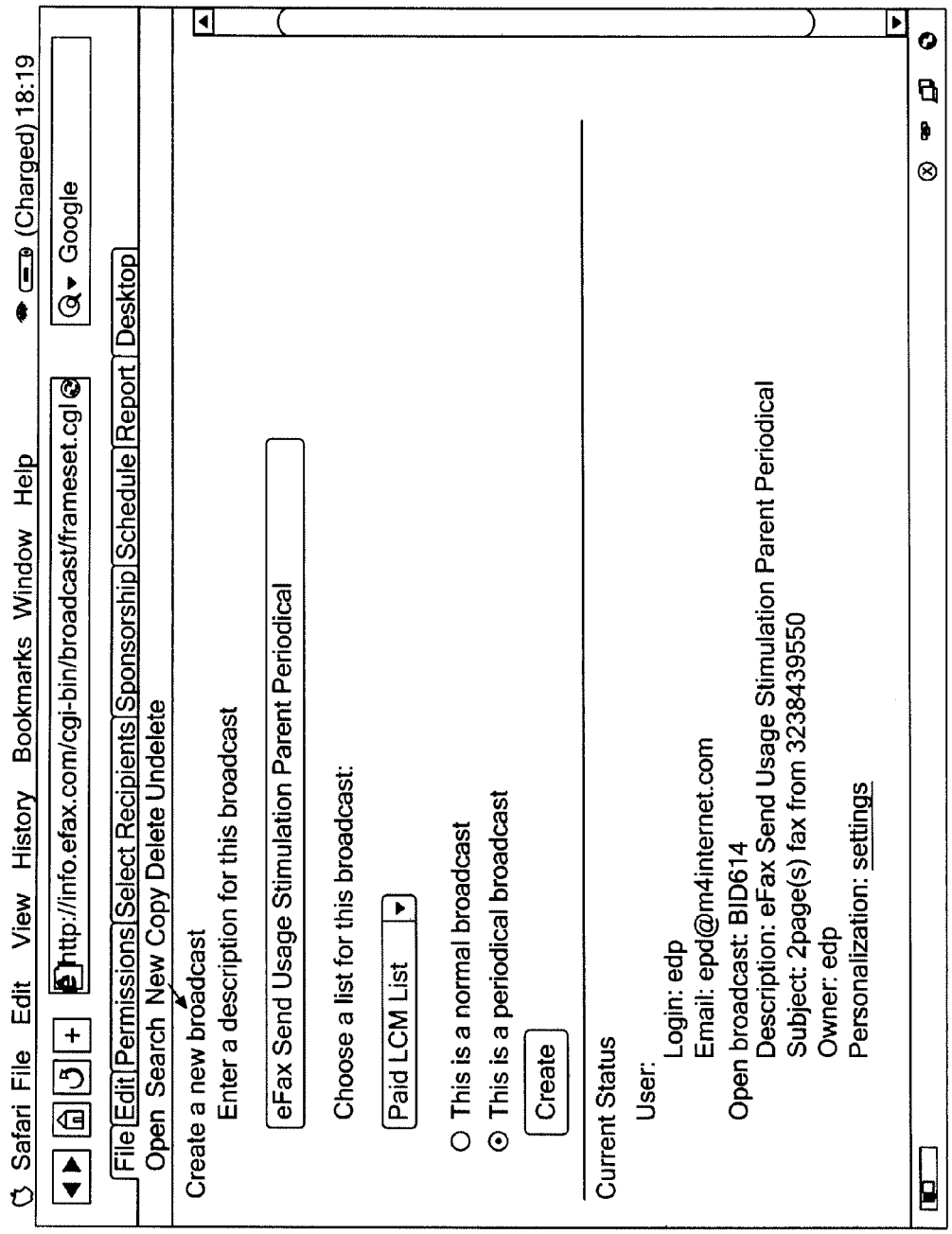
Figure 6B:
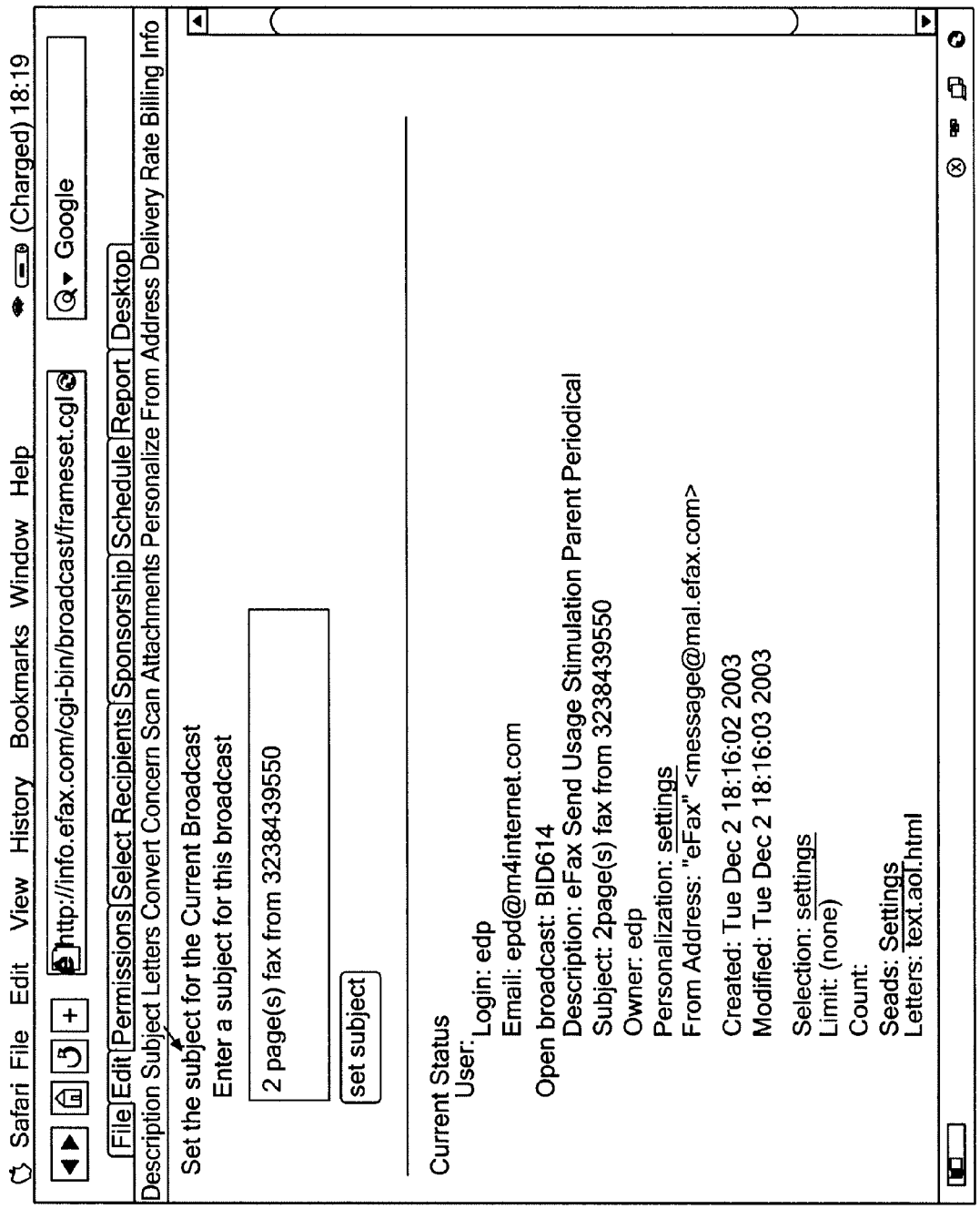
Figure 6C:
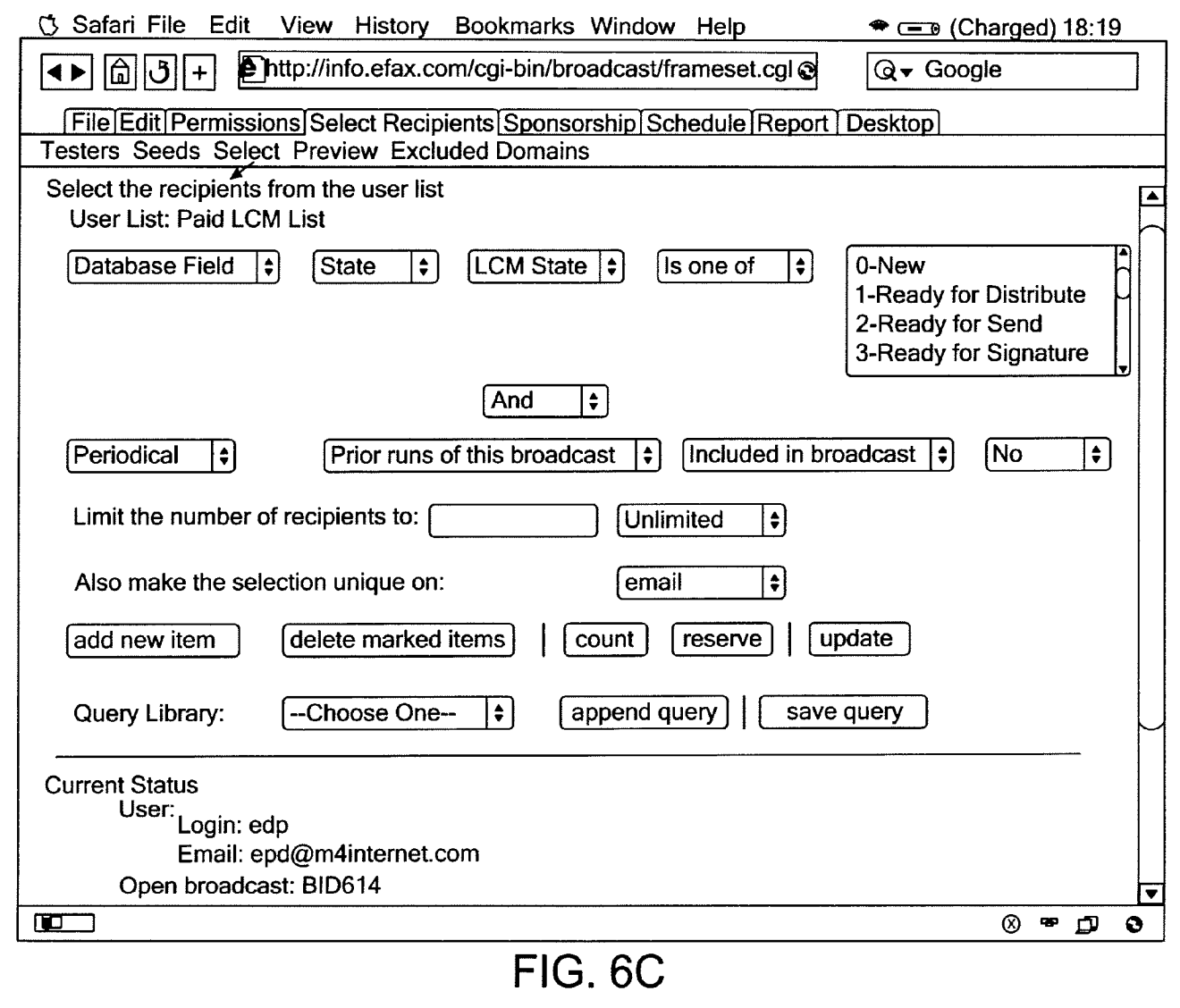

FIGS. 6A-6C show screen shots of a Campaign Manager user interface program. This program may implement part of the Content Presentation Methods 312 (FIG. 3). Beginning with FIG. 6A, in this screen the operator enters a description for a new campaign, and chooses which list of recipients (e.g., paying customers or free customers) should be fed to the LCM cycle. The LCM cycle will be defined below in FIGS. 7A-7F. The operator indicates the Paid LCM List for this example as the source of customers. In addition, this campaign (or also referred to as "broadcast") is to be a periodical, that is the message will repeatedly be sent to the selected customers.

In FIG. 6B, the Campaign Manager prompts the operator to identify the subject of the broadcast. In this case, a document that will represent a two page facsimile will be attached to an email that will be sent to the selected customers.

FIG. 6C allows the operator to further define the group of customers that will be the recipients of this particular campaign. From the list of paid customers, those whose current LCM state is "2-Ready For Send" will be selected. The paying customers that are in state "2" are those who are believed, by the merchant and/or the OMTE, to be likely to respond favorably to an advertisement for the merchant's outbound (or "Send") facsimile service, which allows the customer to send faxes without access to a fax protocol transmission device (e.g., via email to the merchant's fax server network). As to state "3-Ready for Signature", this state would be assigned to those customers who are believed to respond favorably to an offer of the additional capability of adding a digital signature to a received facsimile (so that the customer need not print the received facsimile to sign it). As explained below, the merchant and/or OMTE can specify a set of rules (via the LCM Interface, for example, see FIGS. 7A-7F) that when applied to a list of customer records in the database will transition some or all of the customers on the list from one given state to another. As another example, a set of rules may be defined that identify those customers who would be likely to want to distribute their inbound service fax numbers to a relatively large number of entities that would send faxes to the customer. These customers would transition into state "1-Ready for Distribute". The Content Presentation Methods may then target certain online content that advertises that service to those customers.

Yet another example is a state defined for customers that are likely to want to change their inbound fax number (or add another number) into one that has a certain country or area code. The system may detect that a customer is receiving a large number of faxes from a certain country or area code (that is different than their inbound number). A rule-set could be defined that assigns such customers to state "4-Ready for Change of Inbound Number". The Content Presentation Methods could then target an advertisement for changing inbound fax numbers to customers in that state.

To recap, in FIGS. 6A-6C, the operator has created a new periodical campaign designed to stimulate usage of the merchant's electronic facsimile send service, has described the content of the message that will be delivered in the campaign, and has specified that the campaign is targeted to those paying customers that have been assigned the LCM state value 2, that is those who are believed to be ready for an advertisement directed at increasing the usage of the merchant's Send service.

Figure 7B:
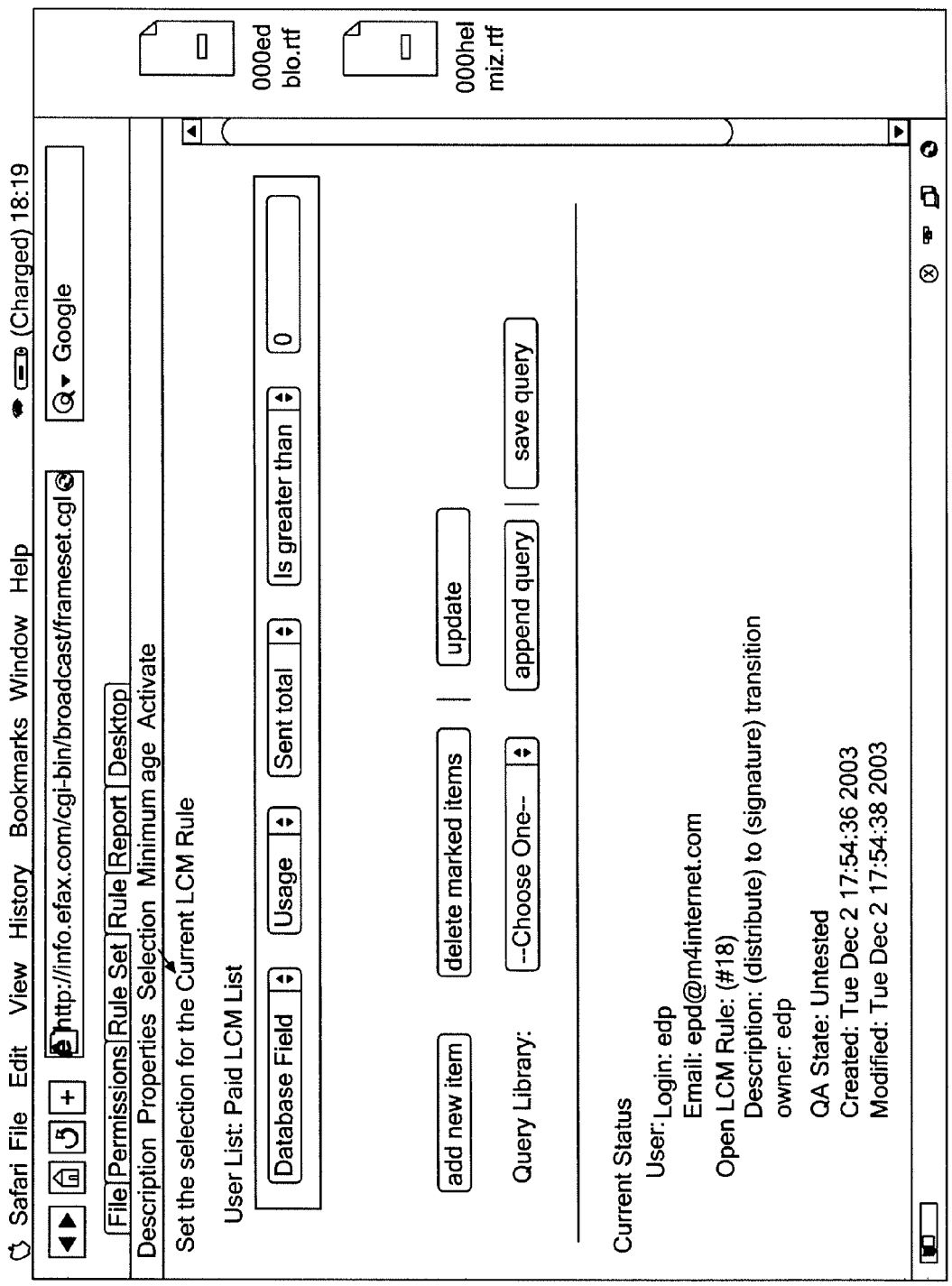

Turning now to FIGS. 7A-7F, some screen shots of the LCM Interface program, which operates as a user interface to the Business Rules Engine 308 (FIG. 3) is shown. In this example, LCM rule #18 is being defined. In FIG. 7A, the properties of the rule are specified. First, this rule is indicated as being applied only to those customer records that are currently in the LCM state "1". The rule, when applied, transitions matching customer records into LCM state "3" (see FIG. 6C, where state "3" are those customers who are believed to be ripe for an upgrade that allows a digital signature to be added to an outbound facsimile). In addition, an execution order of the rule is specified, where in this case the rule is the tenth one to be applied to a given list of customers.

Figure 7C:
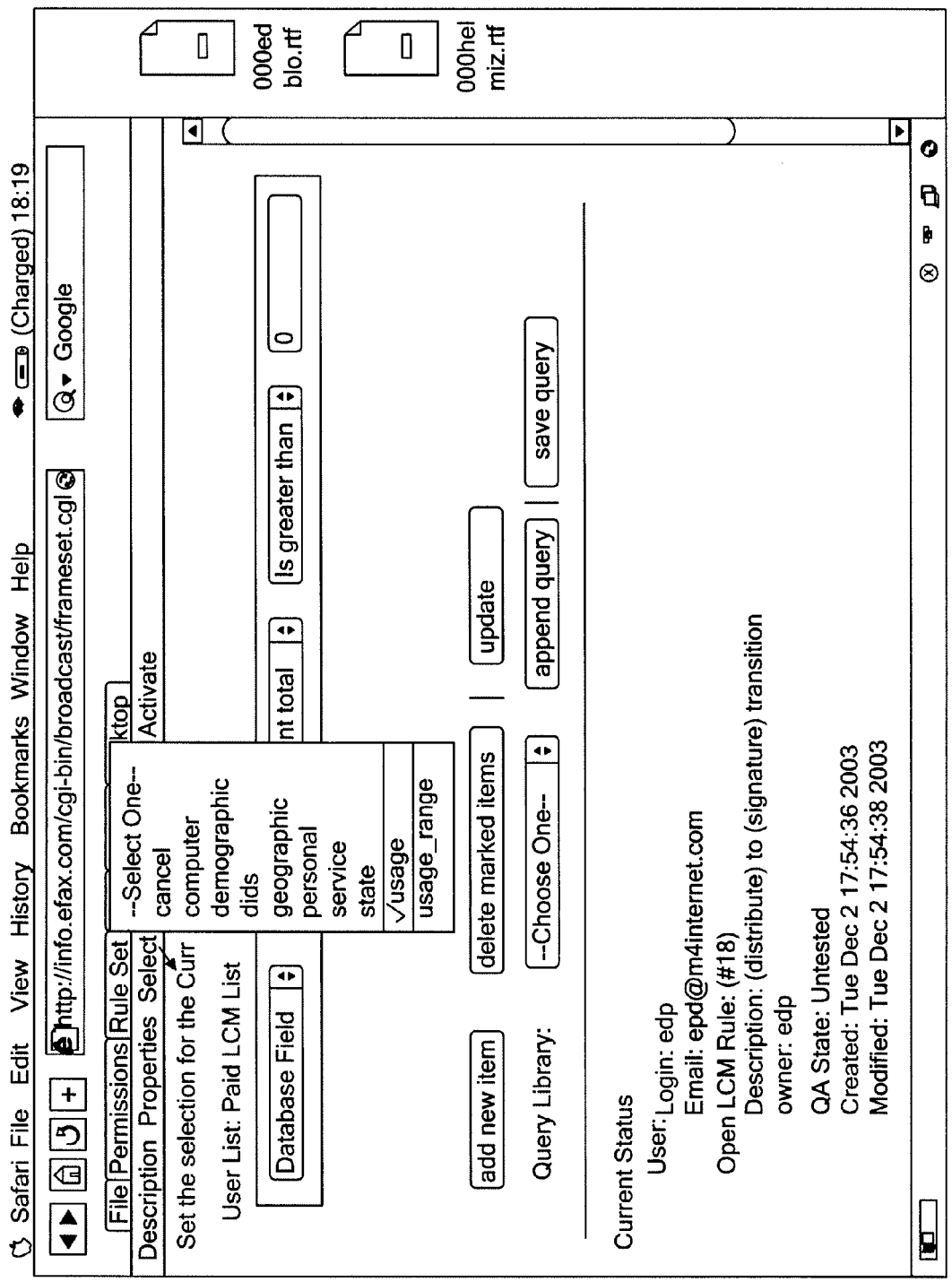
Figure 7D:
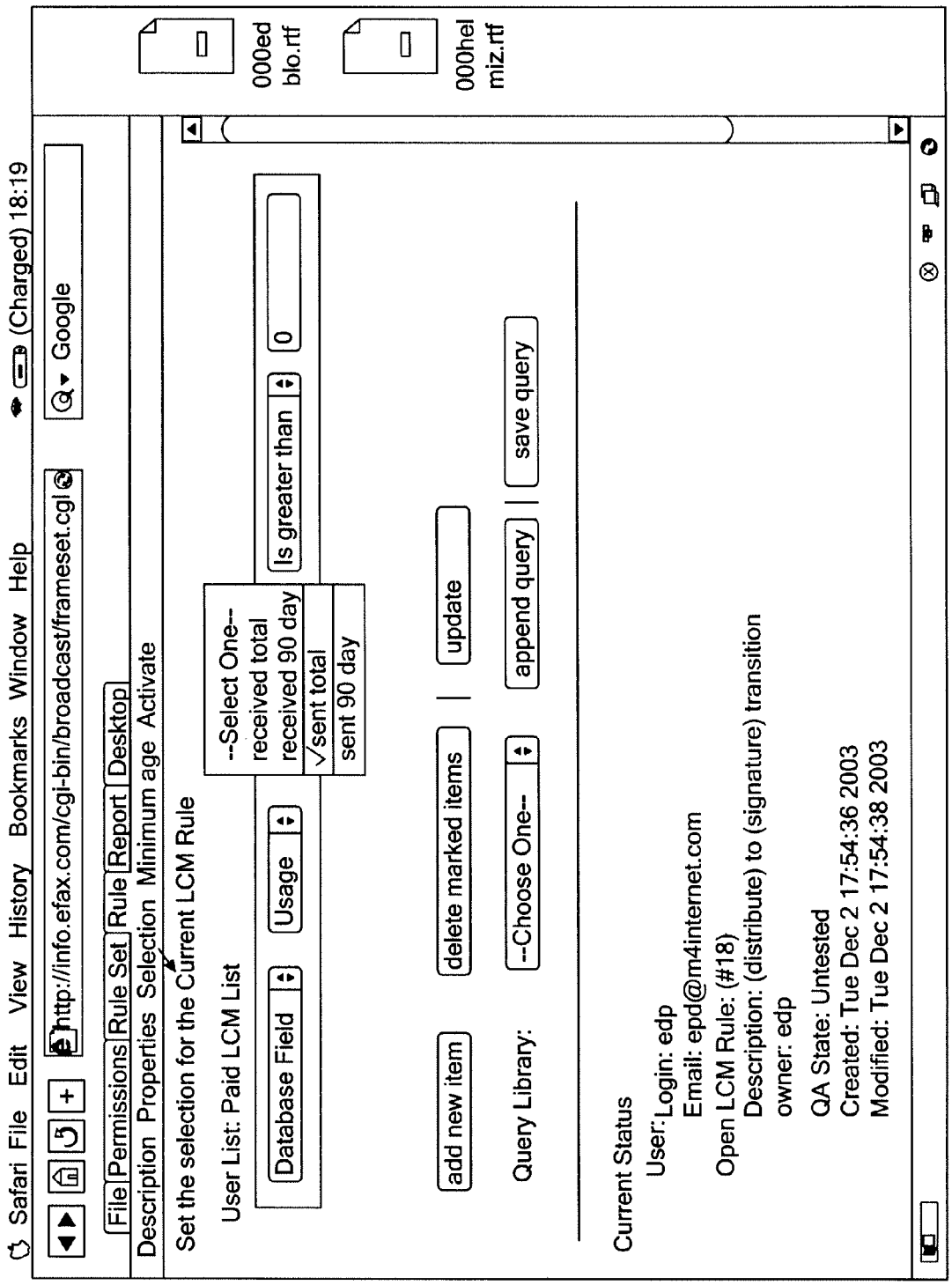
Figure 7E:
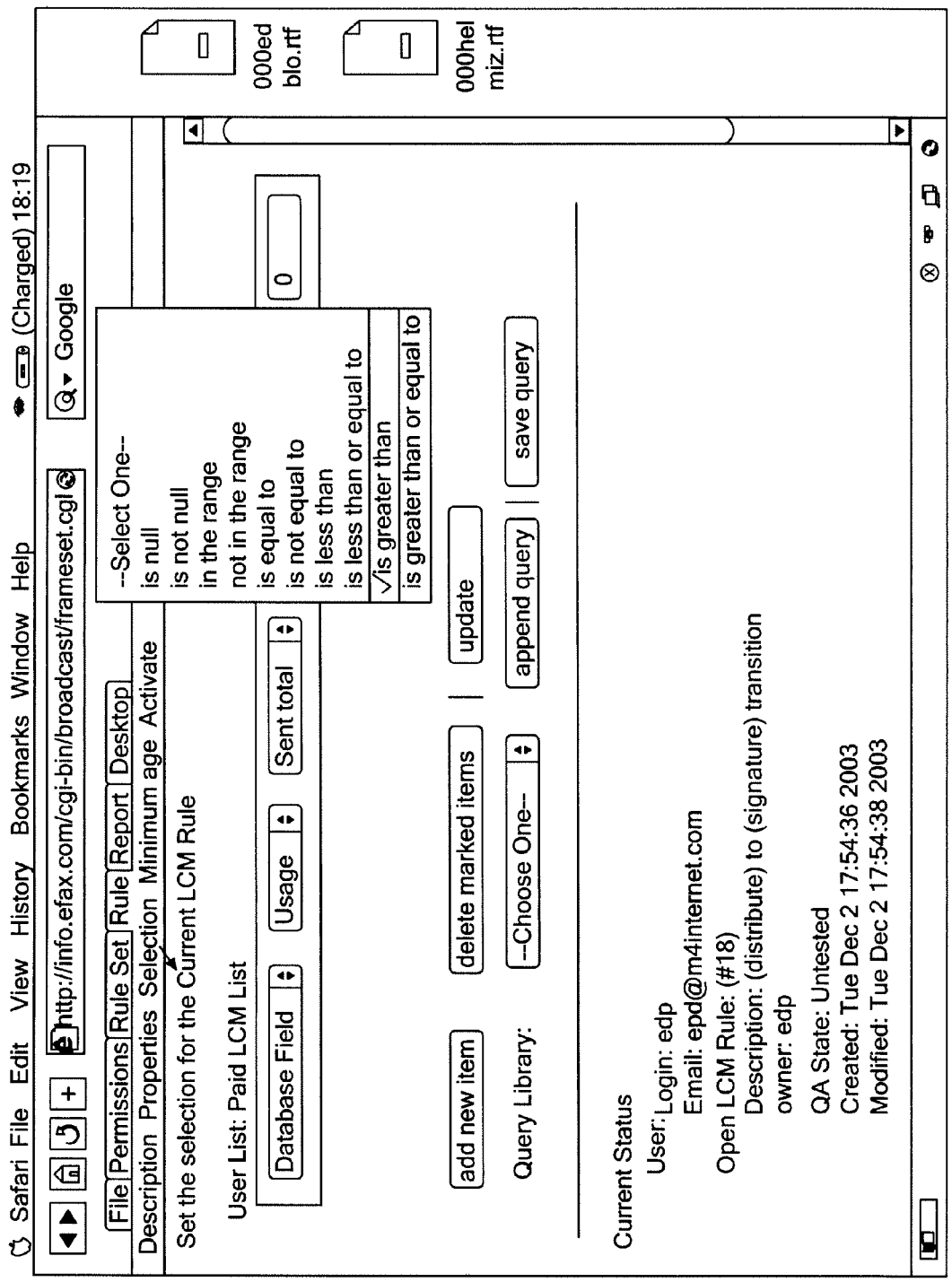

Turning now to FIG. 7B, the operator has further defined the rule as considering only those customers that have sent at least one facsimile. FIG. 7C shows the options that are allowed for defining the rule, based on a number of fields that are available in the customer database. Thus, in addition to "usage", there are several other fields that may be defined for the rule, including cancel (those who have recently canceled their subscription with the merchant), computer (e.g., mobile or desktop, etc.). Each of these options will then prompt the user for further options that are specific to it. For example, the database field option allows the operator to select any one of ten different fields from the customer database to search for matching records. As another example, FIG. 7D shows that the "usage" option presents the operator with one of four possible categories involving the sending and receiving of facsimiles. Finally, in FIG. 7F, the operator is allowed to define that the rule will apply only to those customer records that have been in the specified "from" state for a given number of days.

Figure 8A:
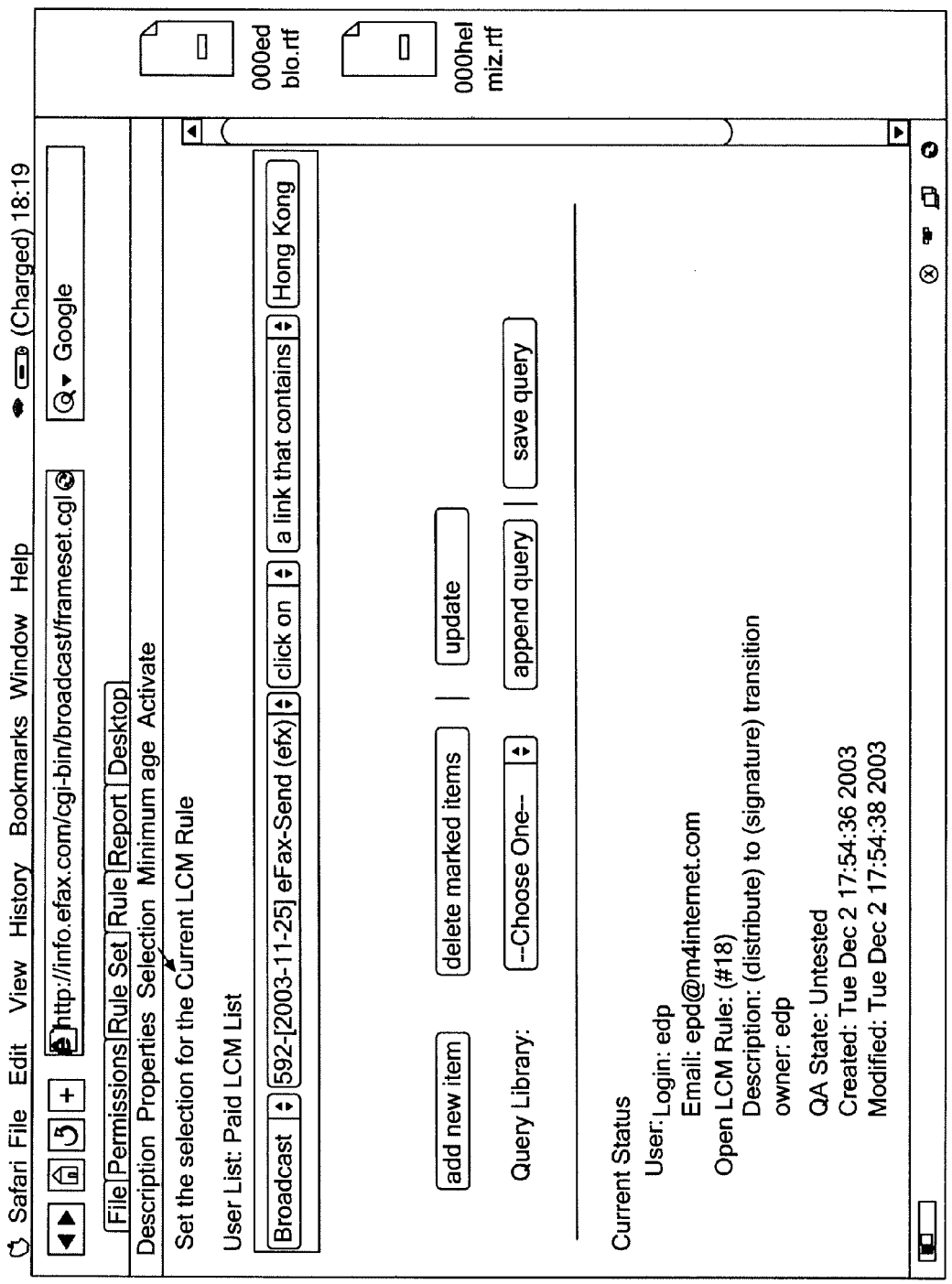
FIG. 8A-8C illustrate screen shots from the LCM Interface, defining a state transition using information collected from a previous campaign.
Figure 8B:
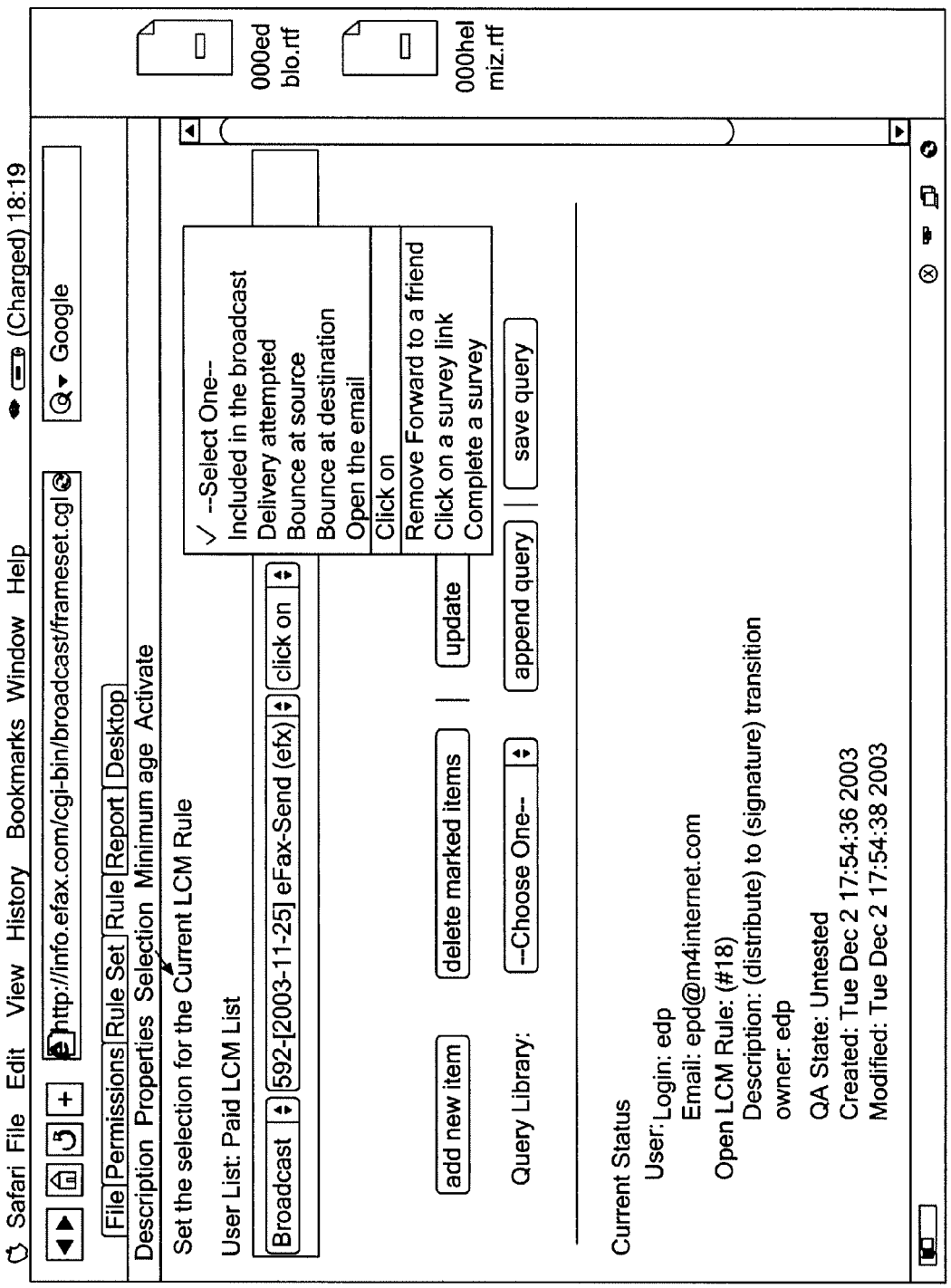
Figure 8C:
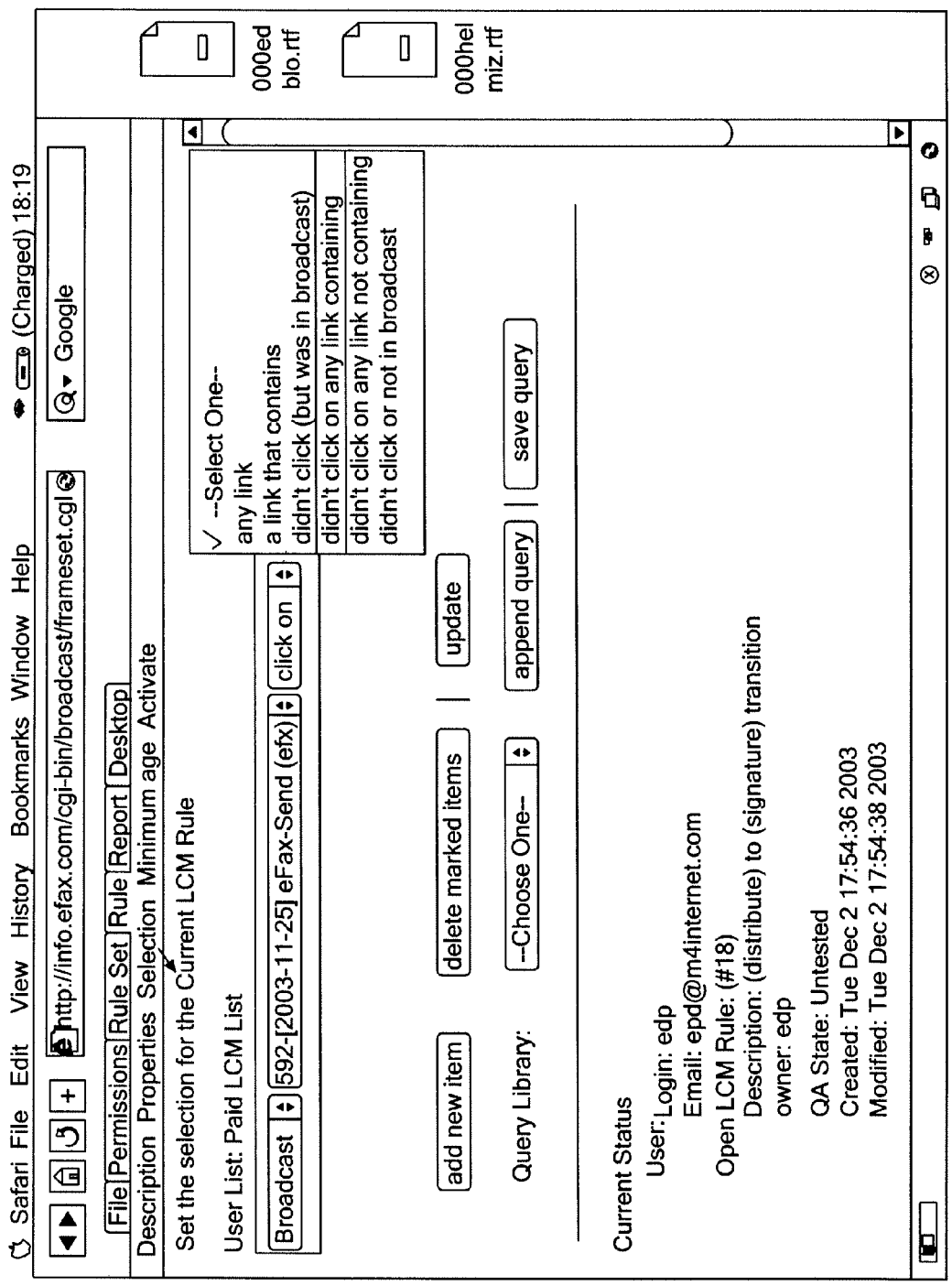

Referring now to FIG. 8A, this figure shows an alternative definition for rule #18, as determined by the operator. In this case, the transition from state "1" to state "3" (FIG. 7A) is determined not based on the usage field in the customer database, but rather whether or not the customer clicked on a link that contains "Hong Kong" in response to an earlier broadcast dated November 25, 2003 that relates to the merchant's Send service. FIGS. 8B and 8C illustrate additional options in defining the rule. For example, in FIG. 8B, there are ten options for evaluating what the customer did in response to receiving the Send service broadcast. As to FIG. 8C, this figure shows how the operator can specify the transition based on whether the customer did or did not click on any particular item of text or graphics in the earlier received broadcast.

Figure 9:
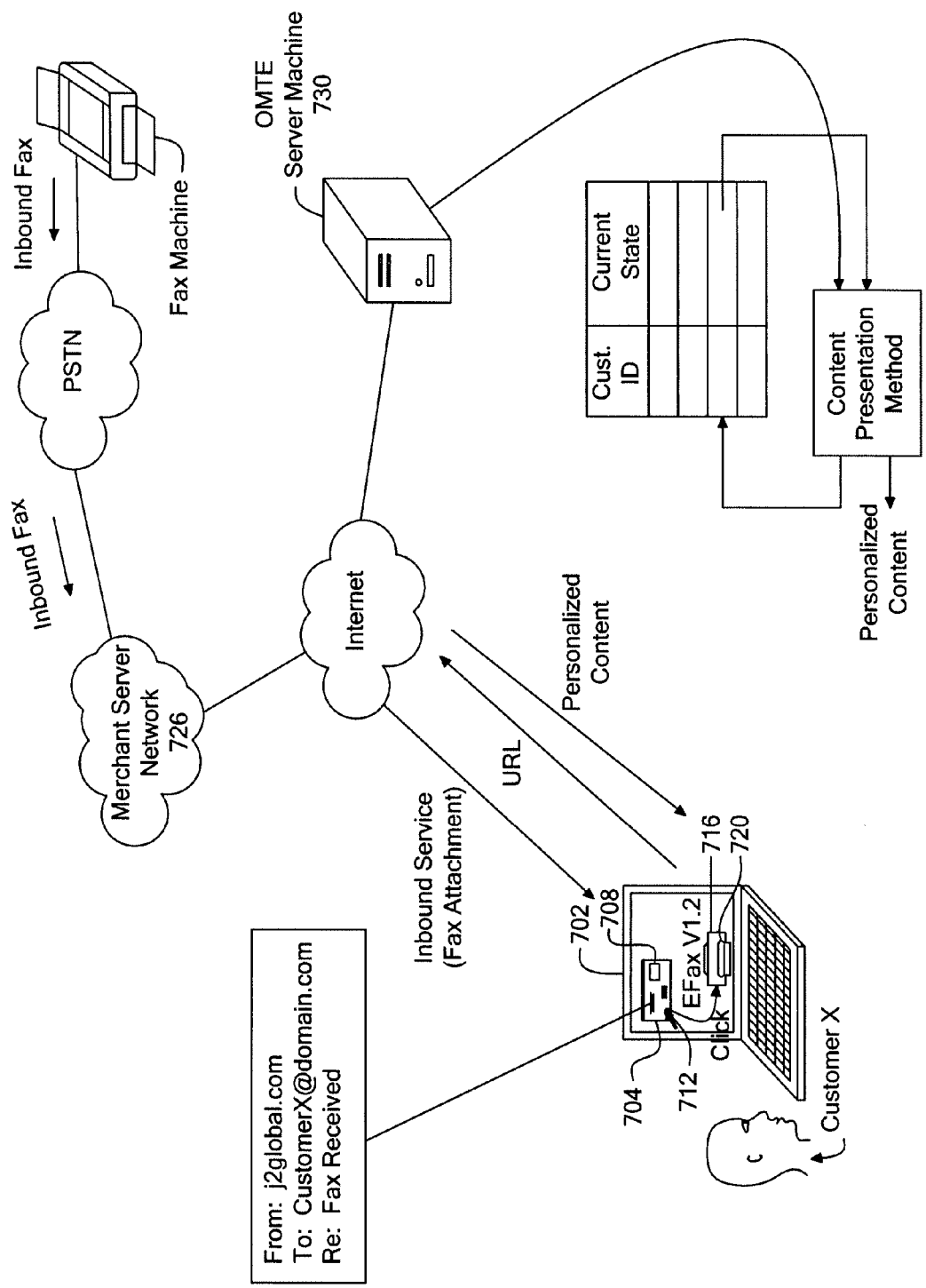
FIG. 9 illustrates an example user interface of a client process for viewing online content that may be personalized based on the state of the customer associated with the process.
Figure 10:
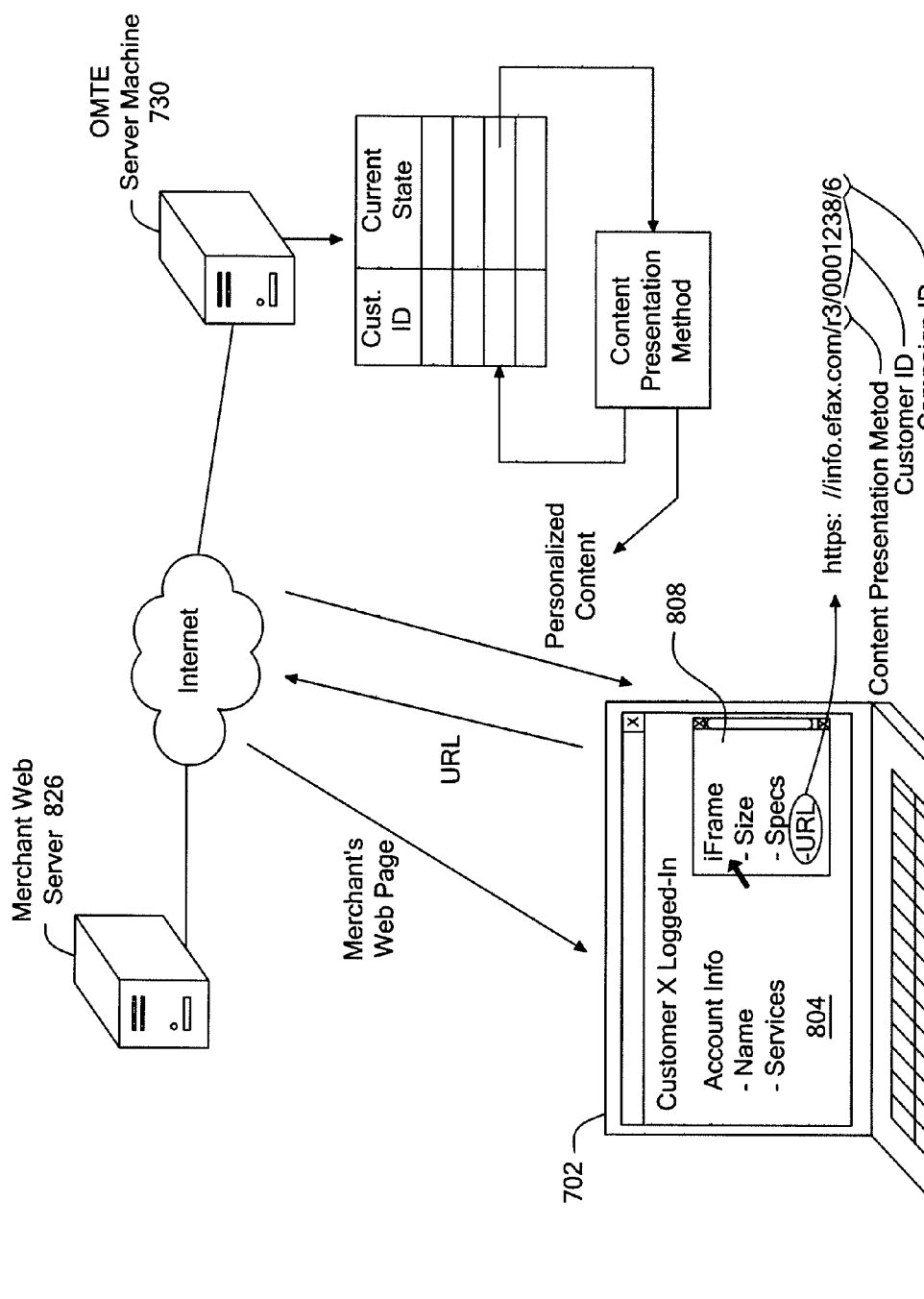
FIG. 10 depicts an example user interface that is presented to a customer by the customer's browser, personalized based on the current state of the customer.

Having described the operation of the online marketing system using several examples that illustrate the type of data collected, as well as the flexibility of the Business Rules Engine and Content Presentation Methods in the context of an email campaign, FIGS. 9 and 10 illustrate examples of the Content Presentation Methods performing "dynamically". Once again referring to the telecommunications and unified messaging service as an example, assume that the unified messaging service provider has a server network 726 that has sent an email message to customer X indicating that a facsimile has been received on the customer's behalf, and including the received fax as an attachment. Thus, in FIG. 9, a screen shot 704 from a client program running on the customer's client machine 702 (which is connected to the Internet) is shown. In particular, the screen shot 704 is of an opened email message that contains an advertisement 708 in addition to a fax attachment icon 712. The customer is, of course, aware that clicking on the fax attachment icon 712 may launch a viewer application, such as EFAX MESSENGER offered by j2 Global Communications, Inc. This viewer application is an example of a client program that helps the customer view the received faxes, by displaying the attachment obtained from the email client program.

In response to the customer clicking on the fax attachment icon 712, the viewer application is launched, beginning with a splash screen 716 being displayed by the customer's client machine 702. The splash screen 716 may contain typical information such as the brand name of the viewer application, as well as its version number. The splash screen provides an introduction to the software product being launched, in this case a viewer application. According to an embodiment of the invention, the splash screen is modified with the ability to push information such as HTML content, onto the client machine. This content may be an advertisement from the merchant that is promoting paying services (particularly for those customers who are currently only subscribing to free services). Alternatively, the content being pushed may be a customer service notice given to any paid or free customer. The splash screen may be designed to persist on the display of the client machine in this manner, for a predetermined period of time or until the user clicks its release.

The viewer application is designed such that once it has been launched, it determines whether an Internet connection exists (which in most circumstances will be the case, particularly for the messaging application described here where a fax attachment to an email has just been received from the merchant). If there is such an Internet connection, then the viewer application may attempt to obtain additional information about the customer. To identify the customer, the viewer application may use the, for example, the inbound fax/voice number that has been assigned to the customer by the unified messaging service merchant. The viewer application may then send a resource locator (e.g., universal resource locator, URL) including the customer identification (e.g., customer's inbound fax number) in the URL. According to an embodiment of the invention, the splash screen 716 may display a window 720 whose content may be determined by the online marketing system, in response to an OMTE server machine 730 receiving the URL sent from the client machine 702.

The request for ad content is done by requesting a particular URL. The URL that is requested would usually contain information that would uniquely identify the customer. The server that returns the content will have used the identity of the customer to do a fast lookup to determine the customer's state and then use that state to determine what content to deliver based on the rules for the content to be delivered.

The format of the resource locator may be as follows:

https://info.efax.com/r3/0001234/7/

In the above example, the resource locator uses the upper layer protocol HTTPS, however, in general other protocols may alternatively be used. In addition, the fully qualified domain name (FQDN) in this example is info.efax.com, which is an FQDN that has been assigned to the merchant. The next field in the resource locator identifies a content presentation method, r3. The online marketing system will recognize this identifier as referring to a particular content presentation method that determines what type of online content is to be personalized here. The next field is the customer identification field, 0001234, which may be a unique identifier assigned to each customer of the merchant. Finally, a campaign identifier, 7, may also be included which identifies the particular online content distribution campaign that is at work here.

The resource locator may be provided by the merchant together with the viewer application, when a customer downloads the viewer application for the first time to be installed in the client machine 702. Alternatively, the resource locator may accompany the fax attachment that was previously downloaded into the client machine 702.

If the viewer application does not obtain the customer identification when the customer downloads the viewer application, then the viewer application may identify the customer the first time the customer receives a fax, by using the inbound fax number the fax was received at. Alternatively, the customer identification may be the customer's email address that is in the "from" field of an email message the first time a send (e.g., outbound fax) is performed by the customer. In general, some form of customer identification can be determined by the viewer application since the customer may need to configure the software to allow it to send.

The URL triggers the online marketing system to obtain the current state of the identified customer and on that basis determine how to personalize the content of the window 720. The personalization data may be sent back to client machine 720 immediately, to be incorporated in the window 702.

Turning now to FIG. 10, FIG. 10 depicts how the merchant's log-in Web page as displayed in a window 804 may be personalized based on the current state of the customer. In this example, the personalized content to be delivered to the customer is displayed via an iFrame 808 that appears after the customer has logged into his or her account via the merchant's Web page. The log-in page may show account information (including the current services that the customer is subscribing to, as well as the ability to modify some of the service options that the merchant provides).

The iFrame 808 may be served by the merchant Web server 826 in response to the log-in request from the customer. In addition to some frame size information and a frame display specification, the merchant Web server 826 would also include a particular type of resource locator, such as the URL introduced above and described in connection with the embodiment of FIG. 9. Upon receiving the URL from the client machine 702, the online marketing system then interprets certain parts of the URL as identifying the customer (customer ID), a particular content presentation method, and a campaign identifier. A table lookup is performed to determine the current state of the identified customer. This state is used by the specified content presentation method, to determine a predefined personalization option that will personalize the Web page currently being displayed on the customer's client machine 702. The information needed to personalize the Web page is then delivered, via the OMTE server machine 730 and through the Internet, to the customer's client machine 702 for use by the iFrame 808.

Email Authoring and Tagging

The following is a description of a content presentation method that may be implemented in software. The online content in this case is an email message or letter that will be created and personalized by software that may be running in an email server machine of the OMTE or merchant (see FIG. 2). The online marketing system automatically creates and personalizes an instance of the letter for each recipient, based on tags and other rules that have been set-up by an operator.

Example Tagging Syntax

Tags allow the adding of certain functions to a letter being sent by the content presentation methods. These tags can be added to various formats (e.g., HTML, text and AOL) with the exception of the Detect tag, which may only be used in the HTML and the AOL letters.

A Link tag allows the tracking of an Anchor Link within the letter. When the recipient clicks on a tracked link the action is first recorded and then the recipient is redirected to the URL specified. The format of the Link tag may be <!-- special_flag link "URL" "Friendly Name" -->. In the AOL or HTML letter, a Normal Anchor Link may be <A HREF="http://www.zxy.com/index.html">Click here</A> whereas a Special Link Tag would be <!-- special_flag link "http://www.zxy.com/index.html" "Click here" -->.

For every link that is tracked, the tracking aspect of the online marketing system may record: the user who clicked; the URL that the user clicked; the IP address of the user; the campaign or broadcast the user received; the platform of the user's computer; the browser the user is running; and the time the user clicked.

When tracked links are listed in a Report that is prepared by the system for an operator of the system after the broadcast, they may be listed by the URL. This URL however may not always be meaningful. Using a Special Label Tag allows a descriptive name to be assigned to the tracked link. This label may then appear in the Report, e.g. place the Label tag directly in front of the Special Link Tag to assign, viz. <!-- special_flag label ""Main" --><!-- special_flag link "http://www.zxy.com/index.html"" -->.

Inserting Values from the Database

An Insert tag may be used to further personalize the letters. The operator may specify that information from an email database or other database (see FIG. 4) be inserted into each letter, such as the recipient's name or account number. The information that may be inserted depends upon the fields that have been set up for a particular email list in the database. An example syntax is: <!-- special_flag insert "x" -->.

A Broadcast Interface to the system may be used to specify the information that the operator wants to insert into the letters. Under an Edit/Personalize option of the Interface, the operator may click on the database fields that are displayed in a selection box.

Tracking Links with Dynamic URL's

The system may also be designed to track a link that has personalized data embedded in the link. For instance, the recipient's user id may be included in the URL in order for the landing page to be able to login the user. To track such a link, a Special Dynamic Track Tag may be used, as follows: <!-- special_flag dynamictrack "URL[dynamic x]" "Friendly Name" -->. Once again, the Broadcast Interface may be designed to enable the personalization field that is to be embedded in the URL portion of the link, e.g. Choosing the Edit/Personalize menu option and highlighting the database field(s) that are desired to be embedded. Note the "x" is replaced with a Field number found in a Personalization table that appears before the operator while using the Broadcast Interface.

Detecting html Opens

The following tag may be used within the HTML letter in order to record the recipient's opening the email. The tag is placed preferably at the bottom of the HTML letter just prior to the Close Body tag. The format of the tag may be: <!-- special_flag detect"""" -->. For every HTML message opened, the tracking part of the system may record: the user who opened the message, the IP address of the user, the broadcast the user received, the platform of the user's computer, the browser the user is running, and the time the user opened the message.

Inserting Remove Links

A Special Remove Tag may be included in all letters. It allows the recipient to request being excluded from future email. For example a sentence may be created that reads "In order to unsubscribe from future email please CLICK HERE". The format of the Special Tag could be: <!-- special_tag remove"" "CLICK HERE" -->.

Inserting a Link to a Survey

The system may also be designed to set up and publish surveys for the recipients to answer. A link to the survey may be placed in email letters to the recipients. When creating a survey in a Survey Interface of the system, a survey number is assigned and the operator will be shown what the Special Survey Tag should be. The format of the tag may be: <!-- Special_flag survey "Survey number" "Friendly Name" -->. When the recipient clicks on this link they will be taken to a Survey Web Page and allowed to complete the survey.

Inserting a Forward to a Friend Link

To give the recipients of the email broadcast the ability to forward the email message to a friend, a Special Forward Tag may be inserted, as follows: To forward this message to a friend <!--M4 forward"" "Click Here"-->.

Special Script Tags—for the Substitution of Conditional Content

To create content that is only sent to particular recipients of an email broadcast, a conditional content tag may be used. For example, <!-- special_flag if "1" "=" "5" -->This line of text would only seen by people who have a value equal to 5 in the database field 1.

<!-- special_flag endif -->

More generally, conditional tags may follow this syntax definition:

<!-- special flag if "field_number" "comparator" "value" -->.
<!-- special flag endif --> where field_number is a value that represents which field in the database the comparison is being based upon, comparator indicates how the field is compared to the value, and value is a constant or a regular expression. A field number may be determined within the Broadcast Interface as follows: Go to the Personalization page in an Edit menu, choose the fields to use for personalization, and click the Select Fields button to submit. To see what field number to use for conditional content, click on the Personalization settings link in the current status area.

The "comparators" may be: ==(is numerically equal to), !=(is not numerically equal to), >(is numerically greater than), >=(is numerically greater than or equal to), eq (is lexicographically equal to or is the same string of characters, ignoring upper/lower-case differences), ne (is not lexicographically equal to), lt (is lexicographically less than—comes first when sorted in alphabetical order), le (is lexicographically less than or equal to), gt (is lexicographically greater than), ge (is lexicographically greater than or equal to), =~(is matched by the regular expression), and !~(is not matched by the regular expression). Others may also be defined.

The "value" is a constant that makes sense for the particular database field and comparator. For example, if using the ==comparator, then the database field should be a number and the value should be a number as well. To have a special offer that only people at AOL would see, for example, a conditional script on the email address could be set up. For example, assuming the email address is field number 1, then the conditional script could be:

<!-- special flag if "1" "=~" "aol.com$" -->
A special offer for AOL customers. . . .
<!-- special flag endif -->

The example above uses the expression "aol.com$", which means to match only when the string ends in aol.com.

Conditional content statements may also use state variables in comparisons.

<!-- special flag if "state_variable" "comparator" "value" -->
<!-- special flag endif --> where state_variable for this aspect of the system is a symbolic name that represents some state information populated by, for example, the outbound Mail Transfer Agent (oMTA), see FIG. 4. The "comparator " indicates how to compare the state_variable to the "value" which is a constant or a regular expression. For example:

<!-- special flag if "forwarded_by" "ne" "" -->

This text is only visible when forwarding an email message.
<!-- special flag endif -->

In this example, the conditional content system would look at the value of the "forwarded_by" variable in the oMTA and check to see if it is empty. The "forwarded_by" variable contains the email address of the person forwarding a message if the email being sent is a forward, otherwise the "forwarded_by" variable is empty. Therefore, if this conditional content statement is true then the message is being forwarded.Special Script—Registers In order to provide a more powerful scripting language in the Campaign Manager (see FIG. 4), "registers" may be added to the software. These registers may hold integer values that can be set, incremented, decremented, and compared against. This allows more flexible conditional content aspects. For example, a content author could include multiple targeted offers in a single email message, but also make sure that no recipient ever gets more than, for example, 3 offers in a particular email message. The content author could also ensure that the offers inserted into the email message are placed according to mathematical rules. Syntax Examples:

1. To set register 4 to have a value of 76: <!--M4 set "r4" ":=" "76" -->.
2. To add 2 to the current value of register 4: <!--M4 set "r4" "+=" "2" -->.
3. To subtract 3 from the current value of register 4: <!--M4 set "r4" "-=" "3" -->.
4. To insert the word "hello" if register 4 is greater than 35:
   <!--M4 if "r4" ">" "35" -->.
   hello
   <!--M4 endif -->

Letter Formatting

An email broadcast may include letters which are formatted for HTML, text, or other formats such as one used by the AOL service provider. With the exception of AOL addresses, each email recipient may receive a multi-part MIME message that may include both the text and HTML letters. Depending on the capabilities of the recipient's email browser, either the text or HTML letter will be displayed to the user. Each letter format has rules defining how the letter is created and modified. Also, each letter may include special Tags as mentioned above, which add certain functions to the letter such as allowing link-tracking or personalization.

A template may be created for the letters. The letter template may include a header area, a "creative" area and a footer area. The header area could contain whatever code or text to display information at the top of the letter. The creative area would be where the operator would cut and paste any new creative element. And the footer would contain what needs to be added at the bottom of the letter. The footer might contain copyright information or other corporate information. The footer may also contain a Special Remove Tag (discussed above). The HTML letter should also include the Special Detect Tag in order to track email opens by the recipient. This should be placed at the end of the footer. Once the header and footer have been determined for each letter type, the templates should be saved. Then, when creating a new letter, these saved templates may be recalled to initialize each letter, cut and paste into (or type into) the creative section, and then save as a new file. Creating a good file directory for organizing letters will be very helpful for locating older letters that might help in formatting new ones. Any one of the following editor software may be used to create the letters: EditPlus (a Windows HTML/Text editor), BBEdit (MacOS), and Emacs and Vi unix based HTML/Text editors.

To summarize, various embodiments of a method and apparatus for automatically determining an online content distribution campaign have been described In the foregoing specification, the invention has been described with reference to specific exemplary embodiments thereof. It will, however, be evident that various modifications and changes may be made thereto without departing from the broader spirit and scope of the invention as set forth in the appended claims. For instance, the above described online Content Presentation Methods are capable of preparing messages that are to be delivered to the customer via an online mechanism, such as email, merchant Web site, HTML or other content that is pushed to the customer's client program (e.g., browser iFrame), etc. In the case of the telecommunications and unified messaging services application, however, there is an additional venue for delivering personalized content, namely a typical facsimile protocol message being transmitted to the customer's assigned inbound fax/voice mail telephone number. The specification and drawings are, accordingly, to be regarded in an illustrative rather than a restrictive sense.

What is claimed is:

1. A computer system for providing electronic communications messaging services, comprising:

a server network having a plurality of server machines coupled to each other via a data network, the server network to store data about a plurality of customers of an electronic communications messaging service provider, wherein a respective state variable is associated with each of the customers, the server network to automatically update the respective state variable with one of a plurality of predefined first states, in response to applying a selected one of a plurality of predefined rules to analyze some of the stored data, wherein the rules are defined in part by the provider, wherein the selected rule is applied to those customers whose respective state variable has a first predefined value which indicates that those customers are subscribing to a free service of the provider, and the selected rule, once applied, transitions the respective state variable to a second predefined value which indicates the customer is ready for a paying service of the provider, the server network to automatically determine whether or not an email message that promotes a paying service of the provider is to be one of a) sent to each of the customers, and b) personalized, based on the respective state variable of the customer.

2. The computer system of claim 1 wherein the server network is to automatically transition the respective state variable from one value to another, as time passes and data about the customer's usage of the services offered by the provider continues to be collected, in response to applying one of the rules to analyze some of the stored data.

3. The computer system of claim 2 wherein some of the stored data includes data that has been derived from online communications between each of the customers and the provider.

4. The computer system of claim 1 wherein some of the stored data includes data that has been derived from online communications between each of the customers and the provider.

5. A computer system for providing electronic communications messaging services, comprising:

a server network having a plurality of server machines coupled to each other via a data network, the server network to store data about a plurality of customers of an electronic communications messaging service provider, wherein a respective state variable is associated with each of the customers, the server network to automatically update the respective state variable with one of a plurality of predefined first states, in response to applying a selected one of a plurality of predefined rules to analyze some of the stored data, wherein the rules are defined in part by the provider, wherein the plurality of predefined first states includes the following three states, 1) a customer who is less than a predetermined period of time old, 2) a customer who is at least a predetermined period of time old and has used a service of the provider, and 3) a customer who is at least a predetermined period of time old and has not used the service, the server network to automatically determine whether or not an email message that promotes a paying service of the provider is to be one of a) sent to each of the customers, and b) personalized, based on the respective state variable of the customer.

6. The computer system of claim 5 wherein the server network is to automatically transition the respective state variable from one value to another, as time passes and data about the customer's usage of the services offered by the provider continues to be collected, in response to applying one of the rules to analyze some of the stored data.

7. The computer system of claim 5 wherein some of the stored data includes data that has been derived from online communications between each of the customers and the provider.

8. A computer system for providing electronic communications messaging services, comprising:

a server network having a plurality of server machines coupled to each other via a data network, the server network to store data about a plurality of customers of an electronic communications messaging service provider, wherein a respective state variable is associated with each of the customers, the server network to automatically update the respective state variable with one of a plurality of predefined first states, in response to applying a selected one of a plurality of predefined rules to analyze some of the stored data, wherein the rules are defined in part by the provider, wherein the plurality of predefined first states includes the following three states, 1) new customer status, 2) whether a new customer has not used a service within a predetermined period of time, and 3) whether a new customer is likely to subscribe to certain additional services, the server network to automatically determine whether or not an email message that promotes a paying service of the provider is to be one of a) sent to each of the customers, and b) personalized, based on the respective state variable of the customer.

9. The computer system of claim 8 wherein the server network is to automatically transition the respective state variable from one value to another, as time passes and data about the customer's usage of the services offered by the provider continues to be collected, in response to applying one of the rules to analyze some of the stored data.

10. The computer system of claim 9 wherein some of the stored data includes data that has been derived from online communications between each of the customers and the provider.

* * * * *